US012686071B2

(12) United States Patent
Xu et al.

(10) Patent No.: US 12,686,071 B2
(45) Date of Patent: Jul. 21, 2026

(54) WIRE BONDING SYSTEMS AND RELATED METHODS OF FORMING A VERTICAL WIRE STRUCTURE

(71) Applicant: Kulicke and Soffa Industries, Inc., Fort Washington, PA (US)

(72) Inventors: Hui Xu, Chalfont, PA (US); Jesse Parish, North Wales, PA (US); Gary S. Gillotti, North Wales, PA (US); Kam-Shing Wong, Lansdale, PA (US); Basil Milton, Furlong, PA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 19/276,533

(22) Filed: Jul. 22, 2025

(65) Prior Publication Data

US 2026/0027644 A1     Jan. 29, 2026

Related U.S. Application Data

(60) Provisional application No. 63/674,872, filed on Jul. 24, 2024.

(51) Int. Cl.
B23K 20/00          (2006.01)
B23K 20/26          (2006.01)
(Continued)

(52) U.S. Cl.
CPC ............ B23K 20/005 (2013.01); B23K 20/26 (2013.01); B23K 37/0426 (2013.01); B23K 2101/40 (2018.08)

(58) Field of Classification Search
CPC .. B23K 20/005; B23K 20/26; B23K 37/0426; B23K 2101/40; B23K 20/004; B23K 20/007
(Continued)

(56) References Cited

U.S. PATENT DOCUMENTS 3,128,648 A * 4/1964 Clagett ................ B23K 20/005
                                                   228/904
3,128,649 A * 4/1964 Avila ................... B23K 20/005
                                                   228/904
(Continued)

FOREIGN PATENT DOCUMENTS

CH        691243 A5 * 5/2001 ........... B23K 20/004
CN        1031907 C * 5/1996 ........ H10W 72/0112
(Continued)

OTHER PUBLICATIONS

International Search Report for PCT international Application No. PCT/US2025/038615.

*Primary Examiner* — Kiley S Stoner
(74) *Attorney, Agent, or Firm* — Christopher M. Spletzer, Sr.

(57)                    ABSTRACT
A wire bonding system is provided. The wire bonding system includes a bond head assembly configured to carry a wire bonding tool. The wire bonding system also includes a support structure configured to support a workpiece. The workpiece is configured for wire bonding. The wire bonding system also includes a movable stage assembly including a movable stage configured to move with respect to the wire bonding tool. The wire bonding tool is configured to press a wire engaged with the wire bonding tool against the movable stage to create a deformed portion of the wire.

22 Claims, 25 Drawing Sheets

(51) Int. Cl.
  *B23K 37/04* (2006.01)
  *B23K 101/40* (2006.01)

(58) Field of Classification Search
  USPC ...................................... 228/180.5, 4.5, 904
  See application file for complete search history.

(56) References Cited

U.S. PATENT DOCUMENTS

| | | | | |
|---|---|---|---|---|
| 3,838,240 A * | 9/1974 | Schelhorn | ............ | B23K 20/005 |
| | | | | 401/2 |
| 4,976,393 A * | 12/1990 | Nakajima | ............ | B23K 20/007 |
| | | | | 228/180.5 |
| 5,037,023 A * | 8/1991 | Akiyama | ............ | B23K 20/007 |
| | | | | 228/180.5 |
| 5,176,310 A * | 1/1993 | Akiyama | ............ | B23K 1/0008 |
| | | | | 228/180.5 |
| 5,452,841 A * | 9/1995 | Sibata | ................... | B23K 26/20 |
| | | | | 228/180.5 |
| 5,653,380 A * | 8/1997 | Haji | .................... | B23K 20/007 |
| | | | | 228/180.5 |
| 5,842,628 A * | 12/1998 | Nomoto | .............. | B23K 20/004 |
| | | | | 219/56.22 |
| 5,906,706 A * | 5/1999 | Farassat | .............. | B23K 20/004 |
| | | | | 228/1.1 |
| 5,967,399 A * | 10/1999 | Takada | ................. | B23K 20/004 |
| | | | | 29/520 |
| 6,260,753 B1 * | 7/2001 | Renard | ............... | B23K 20/007 |
| | | | | 228/180.5 |
| 6,564,989 B2 * | 5/2003 | Arakawa | ............. | B23K 20/004 |
| | | | | 228/180.5 |
| 6,581,283 B2 | 6/2003 | Sugiura et al. | | |
| 6,687,988 B1 | 2/2004 | Sugiura et al. | | |
| 7,004,373 B1 * | 2/2006 | Miller | ................. | B23K 20/004 |
| | | | | 228/103 |
| 7,597,235 B2 * | 10/2009 | Siepe | .................. | B23K 20/004 |
| | | | | 228/180.5 |
| 7,614,540 B2 * | 11/2009 | Kwan | .................. | B23K 20/004 |
| | | | | 228/904 |
| 7,762,449 B2 * | 7/2010 | Cheng | ................. | B23K 20/004 |
| | | | | 228/180.5 |
| 8,141,765 B2 * | 3/2012 | Copperthite | ......... | B23K 20/004 |
| | | | | 228/180.5 |
| 9,087,815 B2 * | 7/2015 | Haba | ................... | B23K 20/004 |
| 9,136,243 B2 * | 9/2015 | Schmidt-Lange | ... | B23K 1/0016 |
| 9,502,371 B2 | 11/2016 | Colosimo, Jr. et al. | | |
| 11,145,620 B2 | 10/2021 | Goh et al. | | |
| 11,842,978 B1 * | 12/2023 | Mui | .................... | B23K 20/004 |
| 11,850,676 B2 * | 12/2023 | Copperthite | ......... | B23K 20/002 |

| | | | | |
|---|---|---|---|---|
| 12,057,431 B2 | 8/2024 | Milton et al. | | |
| 12,451,459 B2 * | 10/2025 | Wang | .................. | B23K 20/004 |
| 2001/0045012 A1 * | 11/2001 | Beaman | .............. | B23K 20/004 |
| | | | | 29/877 |
| 2002/0007957 A1 * | 1/2002 | Murai | .................. | B23K 20/007 |
| | | | | 174/94 R |
| 2003/0192414 A1 * | 10/2003 | Farassat | ............... | B23K 20/004 |
| | | | | 83/699.11 |
| 2007/0062634 A1 * | 3/2007 | Evans, Jr. | ........... | B23K 20/004 |
| | | | | 156/196 |
| 2011/0226838 A1 * | 9/2011 | Aoyagi | ................ | B23K 20/005 |
| | | | | 228/1.1 |
| 2012/0031955 A1 * | 2/2012 | Pham | .................. | B23K 20/005 |
| | | | | 228/49.5 |
| 2014/0034712 A1 * | 2/2014 | Maeda | ................. | B08B 7/0035 |
| | | | | 228/160 |
| 2014/0054277 A1 * | 2/2014 | Sugito | ................. | B23K 20/007 |
| | | | | 219/136 |
| 2015/0249063 A1 * | 9/2015 | Sekine | ................ | B23K 20/005 |
| | | | | 228/4.5 |
| 2016/0365330 A1 * | 12/2016 | Hagiwara | ........... | B23K 20/005 |
| 2019/0237427 A1 * | 8/2019 | Klaerner | .................. | B08B 1/12 |
| 2022/0199570 A1 | 6/2022 | Milton et al. | | |
| 2023/0282613 A1 | 9/2023 | Toyama et al. | | |
| 2024/0014432 A1 * | 1/2024 | Miyazaki | ......... | H01M 10/0404 |
| 2024/0395765 A1 * | 11/2024 | Wang | .................. | B23K 20/004 |
| 2026/0027644 A1 * | 1/2026 | Xu | ....................... | B23K 20/005 |

FOREIGN PATENT DOCUMENTS

| | | | | | |
|---|---|---|---|---|---|
| CN | 1722396 A | * | 1/2006 | .......... | B23K 20/005 |
| CN | 103199029 A | * | 7/2013 | .......... | B23K 20/004 |
| CN | 111790977 A | * | 10/2020 | ......... | H10W 72/075 |
| CN | 119304337 A | * | 1/2025 | ............. | B21F 11/00 |
| DE | 4335468 A1 | * | 4/1995 | .......... | B23K 20/004 |
| DE | 9321269 U1 | * | 1/1997 | | |
| DE | 10326352 A1 | * | 2/2004 | .......... | B23K 20/007 |
| DE | 102013201868 A1 | * | 8/2013 | ............ | B23K 20/10 |
| EP | 3270 A | * | 8/1979 | | |
| EP | 1382412 A1 | * | 1/2004 | .......... | B23K 20/007 |
| JP | 01122129 A | * | 5/1989 | | |
| JP | 06224247 A | * | 8/1994 | | |
| JP | 08-153756 | | 6/1996 | | |
| JP | 10-056034 | | 2/1998 | | |
| JP | H10289 U | * | 12/1998 | ............ | H01L 24/78 |
| JP | 2003142516 A | * | 5/2003 | ............ | H01L 24/78 |
| JP | 4228024 B1 | * | 2/2009 | .......... | B23K 20/004 |
| KR | 20070014761 A | * | 2/2007 | .......... | H10W 72/00 |
| KR | 20110033854 A | * | 3/2011 | ............ | B23K 20/10 |
| TW | 200913094 A | * | 3/2009 | ......... | H10P 72/0444 |

* cited by examiner

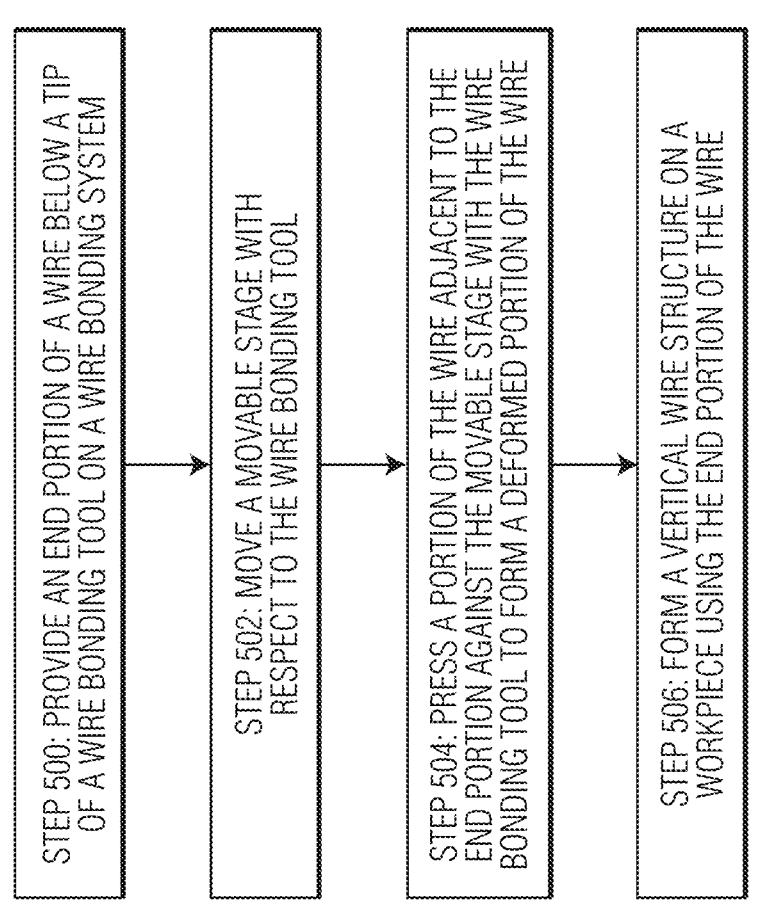

STEP 500: PROVIDE AN END PORTION OF A WIRE BELOW A TIP OF A WIRE BONDING TOOL ON A WIRE BONDING SYSTEM

STEP 502: MOVE A MOVABLE STAGE WITH RESPECT TO THE WIRE BONDING TOOL

STEP 504: PRESS A PORTION OF THE WIRE ADJACENT TO THE END PORTION AGAINST THE MOVABLE STAGE WITH THE WIRE BONDING TOOL TO FORM A DEFORMED PORTION OF THE WIRE

STEP 506: FORM A VERTICAL WIRE STRUCTURE ON A WORKPIECE USING THE END PORTION OF THE WIRE

FIG. 5

WIRE BONDING SYSTEMS AND RELATED METHODS OF FORMING A VERTICAL WIRE STRUCTURE

CROSS REFERENCE TO RELATED APPLICATION

This application claims the benefit of U.S. Provisional Application No. 63/674,872, filed Jul. 24, 2024, the content of which is incorporated herein by reference.

FIELD

The invention relates to wire bonding operations, and in particular, to wire bonding systems, methods of deforming portions of wire, and methods of forming vertical wire structures.

BACKGROUND

In the processing and packaging of semiconductor devices, wire bonding continues to be a primary method of providing electrical interconnection between two locations within a package (e.g., between a die pad of a semiconductor die and a lead of a leadframe). More specifically, using a wire bonder (also known as a wire bonding machine) wire loops are formed between respective locations to be electrically interconnected. The primary methods of forming wire loops are ball bonding and wedge bonding. In forming the bonds between (a) the ends of the wire loop and (b) the bond site (e.g., a die pad, a lead, etc.) varying types of bonding energy may be used, including, for example, ultrasonic energy, thermosonic energy, thermocompressive energy, among others. Wire bonding systems (e.g., stud bumping machines) are also used to form conductive bumps from portions of wire.

Wire bonding systems may also be used to form vertical wire structures, having only one end of the wire bonded to a workpiece. For example, U.S. Pat. No. 6,581,283 (hereinafter "the '283 patent") (entitled "METHOD FOR FORMING PIN-FORM WIRES AND THE LIKE") discloses forming pin-form wires or bumps. Specifically, the '283 patent discloses that "notches 1b are formed in the wire 1 by the cutters 6 . . . before the capillary 4 is lowered and the ball 1a is bonded to an electrode pad." After forming the notches (see FIG. 1(f) of the '283 patent), the "first wire clamper 3 is opened . . . and the ball 1a is pressed against an electrode pad 8 (a bonding object)". Thus, the '283 patent discloses forming notches in a wire prior to forming a bonded portion of the pin-form wire.

In the "Prior Art" portion of the '283 patent, various conventional cutting techniques are disclosed in connection with the formation of pin-form wires such as electric discharge, irradiating laser beams, blowing air, among others. The '283 patent also notes that "the present invention is not limited to a cutter(s)", and that "[a]ny other notch forming means can be used in the present invention.

U.S. Pat. No. 9,502,371 (hereinafter "the '371 patent") (entitled "METHODS OF FORMING WIRE INTERCONNECT STRUCTURES") discloses forming wire interconnect structures by "forming a wire bond at a bonding location . . . extending a length of wire, continuous with the wire bond to another location . . . pressing a portion of the length of wire using the wire bonding tool". Thus, the '371 patent teaches to deform or partially cut a wire through pressing using a wire bonding tool.

It would be desirable to provide improved wire bonding systems, and improved methods of forming vertical wire structures.

SUMMARY

According to an exemplary embodiment of the invention, a wire bonding system is provided. The wire bonding system includes a bond head assembly configured to carry a wire bonding tool. The wire bonding system also includes a support structure configured to support a workpiece. The workpiece is configured for wire bonding. The wire bonding system also includes a movable stage assembly including a movable stage configured to move with respect to the wire bonding tool. The wire bonding tool is configured to press a wire engaged with the wire bonding tool against the movable stage to create a deformed portion of the wire.

According to other embodiments of the invention, the wire bonding system recited in the immediately preceding paragraph may have any one or more of the following features: an end portion of the wire extends from the deformed portion, the end portion being a wire tail; an end portion of the wire extends from the deformed portion, the end portion being configured to form a vertical wire structure on the workpiece; the movable stage is supported by the bond head assembly; the movable stage and the bond head assembly are supported by a common structure of the wire bonding system; the movable stage assembly includes a motion system for moving the movable stage between a first position and a second position; the movable stage assembly includes an arm assembly carrying the movable stage, the motion system moving the movable stage between the first position and the second position by moving the arm assembly; the first position is a retracted position and the second position is a contact position, the wire bonding tool being configured to press the wire against the movable stage at the contact position; the wire includes a wire tail extending below the wire bonding tool, and wherein movement of the movable stage from a first position to a second position results in bending of the wire tail through contact with the movable stage; the wire bonding tool is configured to press the wire engaged with the wire bonding tool against the movable stage to create the deformed portion of the wire after bending of the wire tail through contact with the movable stage; the wire includes a wire tail extending below the wire bonding tool, and wherein movement of the movable stage from a first position to a second position results in the movable stage being positioned below (e.g., directly below, indirectly below) an end of the wire tail; and the bond head assembly is configured to press the wire engaged with the wire bonding tool against the movable stage to create the deformed portion of the wire after the movable stage is positioned directly below the end of the wire tail.

According to another exemplary embodiment of the invention, a method of forming a vertical wire structure on a wire bonding system is provided. The method includes: (a) providing an end portion of a wire below a tip of a wire bonding tool on the wire bonding system; (b) moving a movable stage with respect to the wire bonding tool; (c) pressing a portion of the wire adjacent to the end portion against the movable stage with the wire bonding tool to form a deformed portion of the wire; and (d) forming the vertical wire structure on a workpiece using the end portion of the wire.

According to other embodiments of the invention, the method recited in the immediately preceding paragraph may have any one or more of the following features: wherein an end portion of the wire extends from the deformed portion, and step (b) includes bending the end portion of the wire through contact with the movable stage; wherein an end portion of the wire extends from the deformed portion, and step (b) includes moving the movable stage below the end portion of the wire; step (a) includes advancing the end portion of wire below the tip of the wire bonding tool; the step of advancing includes (i) operating a first wire clamp and a second wire clamp of the wire bonding system in conjunction with (ii) moving of the first clamp and the wire bonding tool, to advance the length of wire below the tip of the wire bonding tool; the step of advancing includes using ultrasonic energy to assist in the step of advancing the end portion of the wire; forming a free air ball on an end of the end portion after step (a), and wherein step (d) includes bonding the free air ball to the workpiece such that the bonded free air ball is a lower part of the vertical wire structure; lowering the wire bonding tool with respect to the end portion of the wire, after step (c), to at least partially straighten the end portion of wire; forming a free air ball on an end of the end portion after step (a), the method further comprising a step of seating the free air ball at the tip of the wire bonding tool, and step (d) includes bonding the free air ball to the workpiece such that the bonded free air ball is a lower part of the vertical wire structure; and step (d) includes raising the wire bonding tool above the bonded free air ball prior to step (d), and tearing the wire at the deformed portion.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 5 is a flow diagram illustrating a method of forming a vertical wire structure on a wire bonding system, in accordance with various exemplary embodiments of the invention.

DETAILED DESCRIPTION

Figures 1A, 1B:
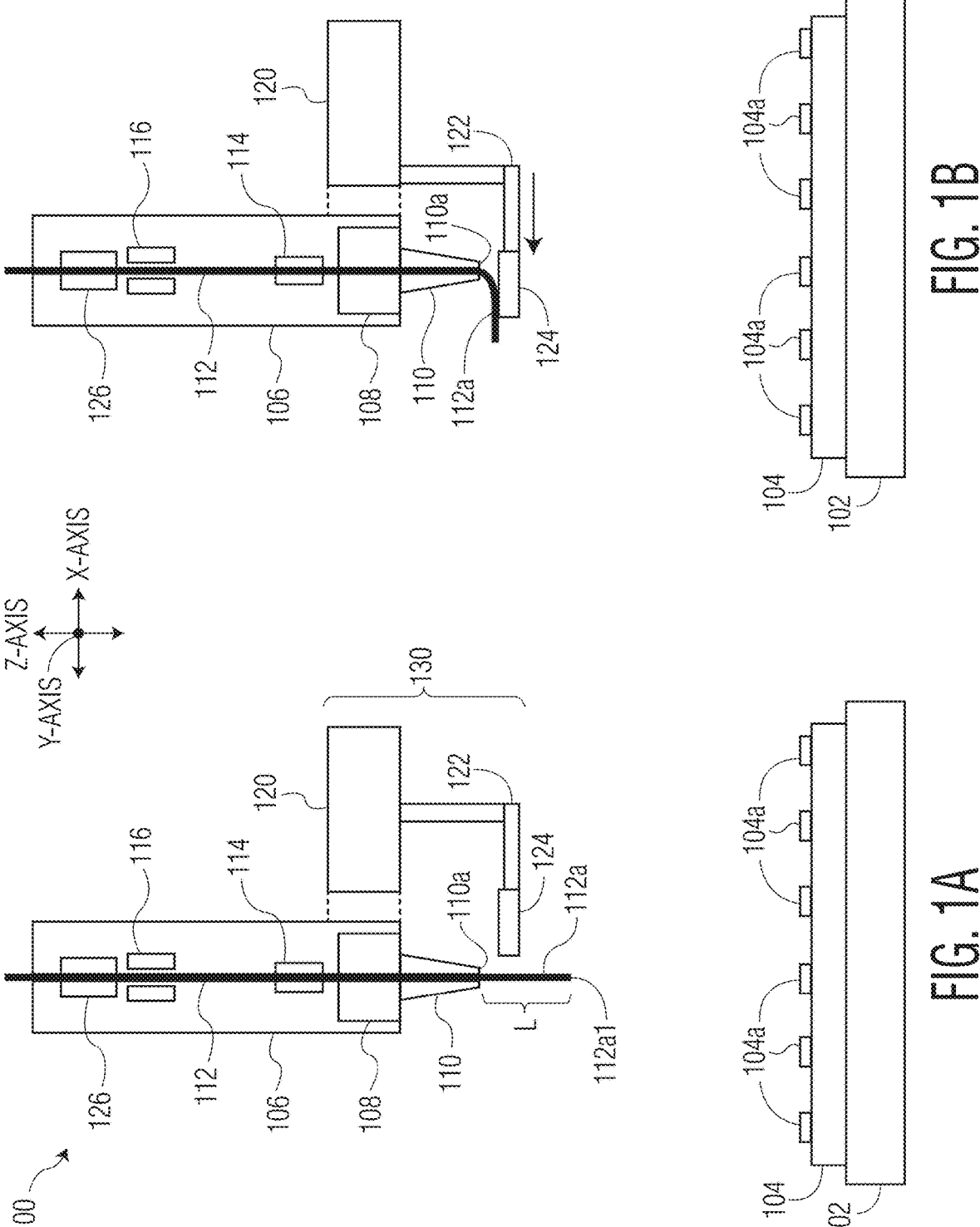
FIGS. 1A-1J, FIGS. 2A-2J, FIGS. 3A-3M, and FIGS. 4A-4M are block diagram front views of a wire bonding system illustrating methods of deforming a portion of wire and forming a vertical wire structure in accordance with various exemplary embodiments of the invention.

Methods of deforming a portion of a wire and/or forming a vertical wire structure on a wire bonding system are provided herein. Certain embodiments may improve wire straightness, wire height consistency, manufacturing yield, and/or throughput.

Certain exemplary methods (e.g., manufacturing work flow) include: forming a free air ball (FAB) (e.g., using an electric flame off (EFO) device), seating the FAB, implementing a controlled wire feed process (e.g., performed using dual wire clamps) configured to provide a vertical wire height, implementing a wire folding process (e.g., conducted using a movable stage) that may or may not be installed on a bond head assembly of a wire bonding system, and implementing a wire deforming process (e.g., a nicking process) on the movable stage, thereby providing a deformed point on the wire. A wire with the deformed point may be at least partially pulled back through a wire bonding tool and the movable stage may be retracted. The FAB may then be seated and then bonded to a workpiece. After bonding, certain components of a bond head assembly move upward to a set height thereby breaking the wire with a load on the deformed point to form a vertical wire structure.

The movable stage described herein may vary considerably depending on the application. For example, the size and/or height of the stage may be increased or decreased as desired, for example, in consideration of application specific concerns (e.g., spacing, weight, etc.). The material selected for the movable stage may also be varied, for example, in consideration of factors such as wear resistance, weight, potential damage to a wire, potential damage to a wire bonding tool, etc. In certain applications, the movable stage may be considered as a consumable element of a wire bonding system, that may be replaced from time to time.

As used herein, the term "vertical wire structure" (or "wire interconnect structures") is intended to refer to conductive structures that may be used to provide any type of electrical function (e.g., a temporary interconnection as in a contact used for testing, a permanent interconnection as in a semiconductor package interconnect, a structure used for electrical shielding, among other uses). A vertical wire structure includes a conductive material (e.g., a wire) bonded at one end, with a length of the conductive material extending generally perpendicular to a workpiece (e.g., a substrate). Typically, the other end of the vertical wire structure is free (not bonded) to a workpiece. It should be understood that a vertical wire structure may not be entirely straight (e.g., the wire may extend from the workpiece along a slight angle), and may include non-vertical components (e.g., a bend, a kink, etc.).

As used herein, to "advance" a wire portion is intended to refer to increasing a length of wire provided below a tip of a wire bonding tool, and does not necessarily involve advancing more wire from a wire source such as a wire spool. Conversely, to "retreat" a wire portion is intended to refer to decreasing a length of wire provided below a tip of a wire bonding tool.

As is known to those skilled in the art, wire bonding systems often include an xy table (to move elements along the x-axis and the y-axis of the wire bonding system). Elements carried by the xy table of a wire bonding system may be considered to be a "bond head assembly". For example, a y-axis slide of the xy table (or another part of the xy table) may carry such elements. Certain of the elements also move along a z-axis of the wire bonding system (e.g., a movable wire clamp, an ultrasonic transducer, a wire bonding tool)—where such elements may be carried by a z-axis link of the wire bonding system. Certain of the elements do not move along the z-axis of the wire bonding system (e.g., a fixed wire clamp, a wire tensioner, an optics assembly, etc.).

It should be understood that certain users of wire bonding systems may refer to the z-axis link (and/or the elements that move along the z-axis) as the bond head assembly—where the elements that do not move along the z-axis are not considered part of the bond head assembly. The present invention has applicability regardless of how the term "bond head assembly" is used. Thus, the invention should not be limited to any specific interpretation of the term.

Certain embodiments are best described in connection with the drawings. Throughout the various drawings, like reference numerals refer to like elements.

Referring now to the drawings, FIGS. 1A-1J illustrate a wire bonding system 100. Referring specifically to FIG. 1A, wire bonding system 100 includes a bond head assembly

106 configured to carry a wire bonding tool 110. Bond head assembly 106 is illustrated including a transducer 108 (e.g., an ultrasonic transducer) operably coupled to wire bonding tool 110 (e.g., a capillary). Bond head assembly 106 further includes a wire clamp 114 (e.g., a lower wire clamp, movable along a z-axis of wire bonding system 100, etc.), a wire clamp 116 (e.g., an upper wire clamp, stationary along the z-axis of wire bonding system 100, etc.) and a wire tensioner 126. Certain elements of bond head assembly 106 are supported by a structure (e.g., a z-axis link) of wire bonding system 100, and move together along the z-axis of the wire bonding system 100. For example, such elements include wire clamp 114, transducer 108, and wire bonding tool 110. Other elements of bond head assembly 106 (e.g., wire tensioner 126 and wire clamp 116) may not move along the z-axis of the wire bonding system 100 with the previously mentioned elements. Although bond head assembly 106 is illustrated with a box that is lengthening and shortening as wire bonding tool 110 moves along the z-axis throughout the various drawings, this is done for illustration purposes only; in reality, only certain components of bond head assembly 106 are moving (e.g., wire bonding tool 110, wire clamp 114, transducer 108, etc.).

Wire bonding system 100 also includes a support structure 102 configured to support a workpiece 104. Workpiece 104 (e.g., a semiconductor die, a substrate, a semiconductor wafer, etc.) is configured for wire bonding. For example, workpiece 104 includes a plurality of bonding pads 104a for wire bonding (e.g., forming a vertical wire structure via wire bonding).

Wire bonding system 100 also includes a movable stage assembly 130 including a movable stage 124 configured to move with respect to wire bonding tool 110. Wire bonding tool 110 is configured to press a wire 112 engaged with wire bonding tool 110 (e.g., end portion 112a of wire 112) against movable stage 124 to create a deformed portion (e.g., deformed portion 112b of FIG. 1C) of wire 112. Movable stage assembly 130 may be connected to, supported by, and/or considered part of bond head assembly 106 (as indicated by the dashed lines). Movable stage assembly 130 and bond head assembly 106 may be supported by a common structure (e.g., a front y-axis slide) of wire bonding system 100 (not shown). Movable stage assembly 130 is illustrated including an arm assembly 122 and a motion system 120 (e.g., an actuator, a motor, etc.). In certain embodiments, movable stage 124 may be moved via arm assembly 122 along an xy plane of wire bonding system 100 (e.g., a linear motion, a curved motion, a curvilinear motion, etc.) between a first position (e.g., a retracted position) and a second position (e.g., a contact position) using motion system 120. It should be understood that movable stage 124 may be moved along any axis (or combination of axes) and/or about any axis, and in any direction, as needed to move between a desired first position and a second position. Further, a height of the movable stage may be adjusted (e.g., manually, automatically, etc.) to accommodate the desired height of a vertical wire structure. Such adjustments may be made prior to production, or during production wire bonding.

As illustrated in FIG. 1A, an end portion 112a (e.g., a wire tail) of wire 112 has been advanced and/or provided such that a length L of wire (e.g., a length of a vertical wire structure and associated formed bond) extends below a tip 110a of wire bonding tool 110, terminating at an end 112a1 of wire 112. For example, wire clamp 114 (illustrated in a closed position) may be used in connection with wire clamp 116 (illustrated in an open position) to advance end portion

112a to a desired length for a particular wire bonding operation (e.g., vertical wire structure formation).

Figure 1D:
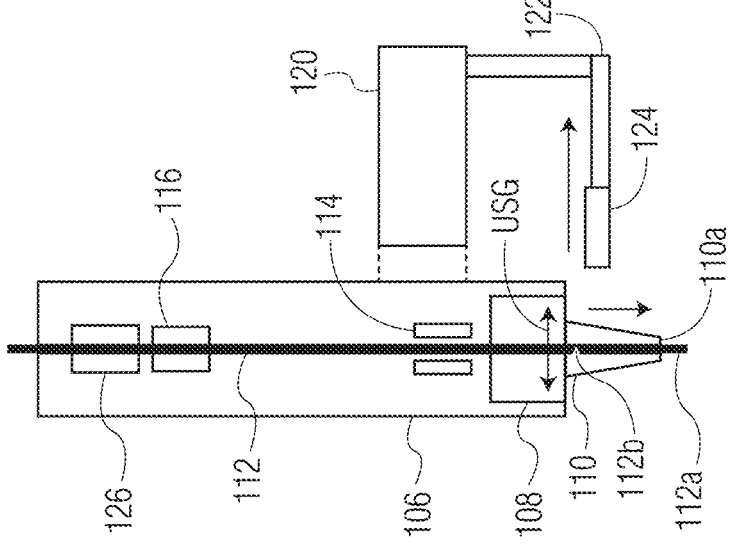
Figure 1D:
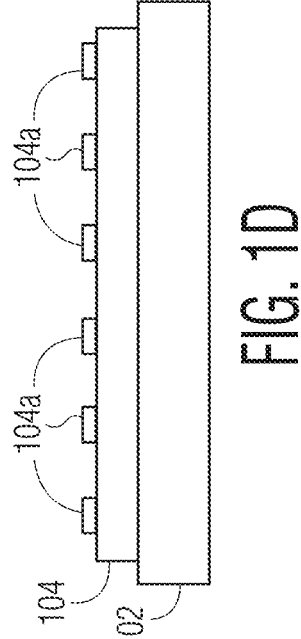

In certain embodiments, in lieu of advancing end portion 112a, the length of end portion 112a below tip 110a of wire bonding tool 110 may be the result of a previously formed vertical wire structure (e.g., see end portion 112b' in FIG. 1J). In certain embodiments, the step of advancing end portion 112a includes (i) operating wire clamp 114 and wire clamp 116 of wire bonding system 100 in conjunction with (ii) moving of wire clamp 114 and wire bonding tool 110 along the z-axis of wire bonding system 100, to advance a length of wire (e.g., end portion 112a) below a tip 110a of wire bonding tool 110. For example, the "operating" of wire clamp 114 and wire clamp 116 may be opening or closing the clamps, as desired, to advance wire 112.

Referring now to FIG. 1B, movable stage 124 has been moved laterally along the xy plane (including motion along the x-axis as illustrated) to a contact position, thereby contacting a side of end portion 112a of wire 112. End portion 112a has been bent (e.g., approximately perpendicular to the z-axis of wire bonding system 100), in preparation for a pressing and/or deforming operation illustrated in FIG. 1C.

Figure 1C:
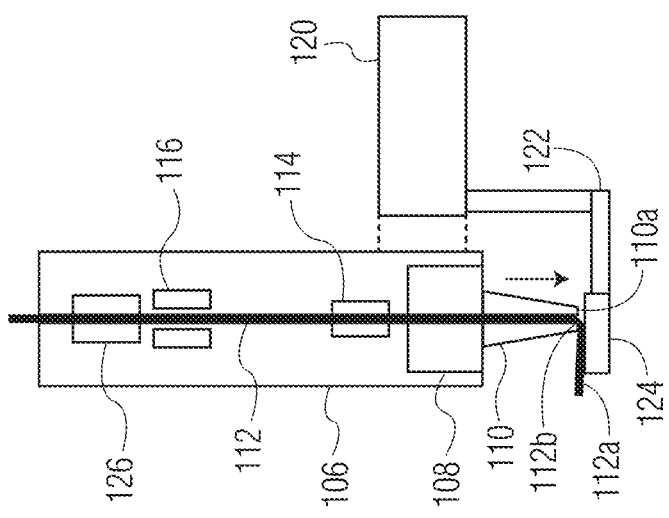
Figure 1C:
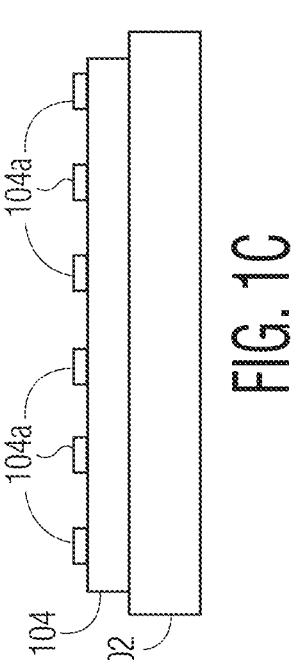

Referring now to FIG. 1C, wire bonding tool 110 has been moved vertically downward along the z-axis (along with wire clamp 114 and transducer 108), thereby pressing end portion 112a against movable stage 124. Thus, a deformed portion 112b (e.g., a thinned portion of wire, a partially severed portion of wire, etc.) of wire 112 has been formed (e.g., by tip 110a of wire bonding tool, etc.), and end portion 112a of wire 112 extends from the deformed portion 112b. During the pressing operation, wire clamp 114 is illustrated in a closed position and wire clamp 116 is illustrated in an open position.

Referring now to FIG. 1D, wire bonding tool 110 has moved vertically downward along the z-axis with wire clamp 114 open and wire clamp 116 closed, thereby at least partially straightening end portion 112a. Transducer 108 is illustrated providing ultrasonic energy (i.e., USG) to assist in advancing and/or retreating length of wire 112 with respect to wire bonding tool 110 (it being understood that the application of USG is optional). In the illustrated embodiment, deformed portion 112b is shown now within the body of wire bonding tool 110, such that part of end portion 112a is also within the body of wire bonding tool 110, and another part of end portion 112a extends below a tip of wire bonding tool 110 as a wire tail. Movable stage 124 is illustrated moving (e.g., simultaneously, asynchronously, etc.) along the x-axis to a retracted position away from wire bonding tool 110.

Figure 1E:
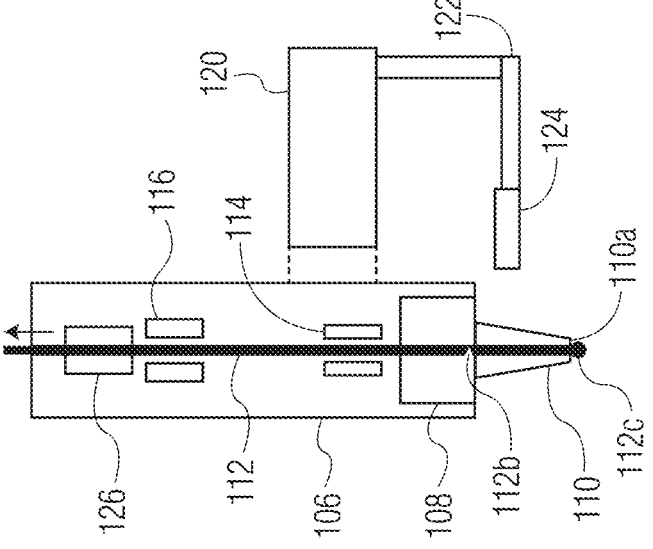
Figure 1E:
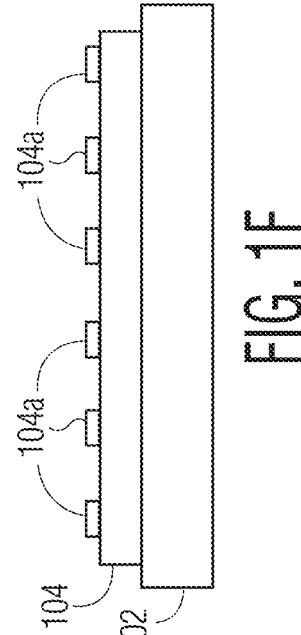
Figure 1F:
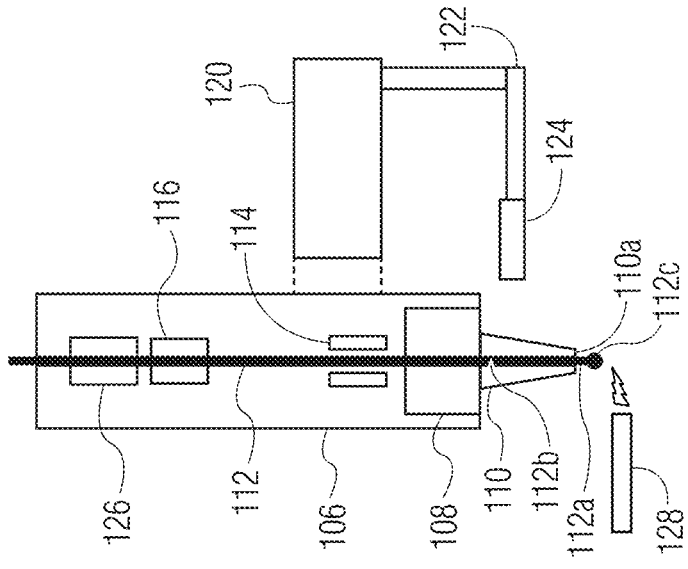
Figure 1F:
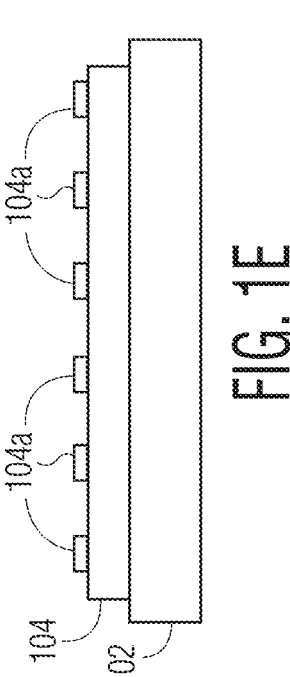

Referring now to FIG. 1E, an electronic flame off (EFO) device 128 is in proximity to end portion 112a to form a free air ball 112c (FAB) on end portion 112a (e.g., the z-axis link may move end portion 112a to be in proximity to EFO device 128). Referring now to FIG. 1F, with wire clamp 114 and wire clamp 116 both open, FAB 112c is seated at tip 110a of wire bonding tool 110 using wire tensioner 126.

Figure 1H:
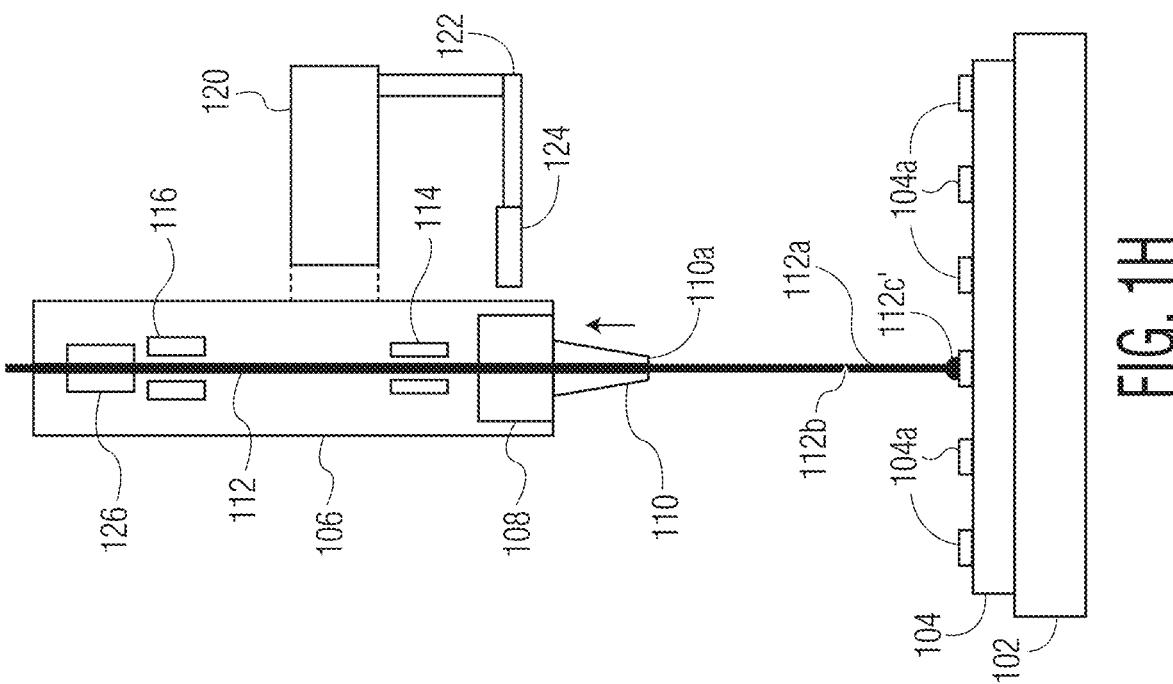
Figure 1G:
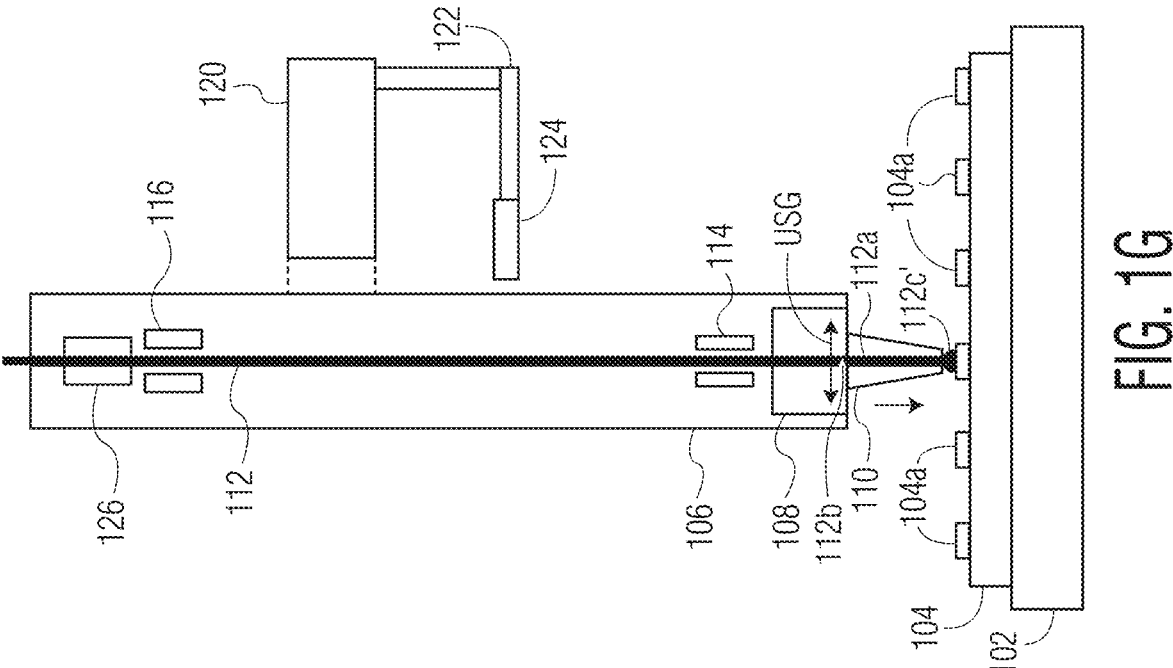
Figure 1I:
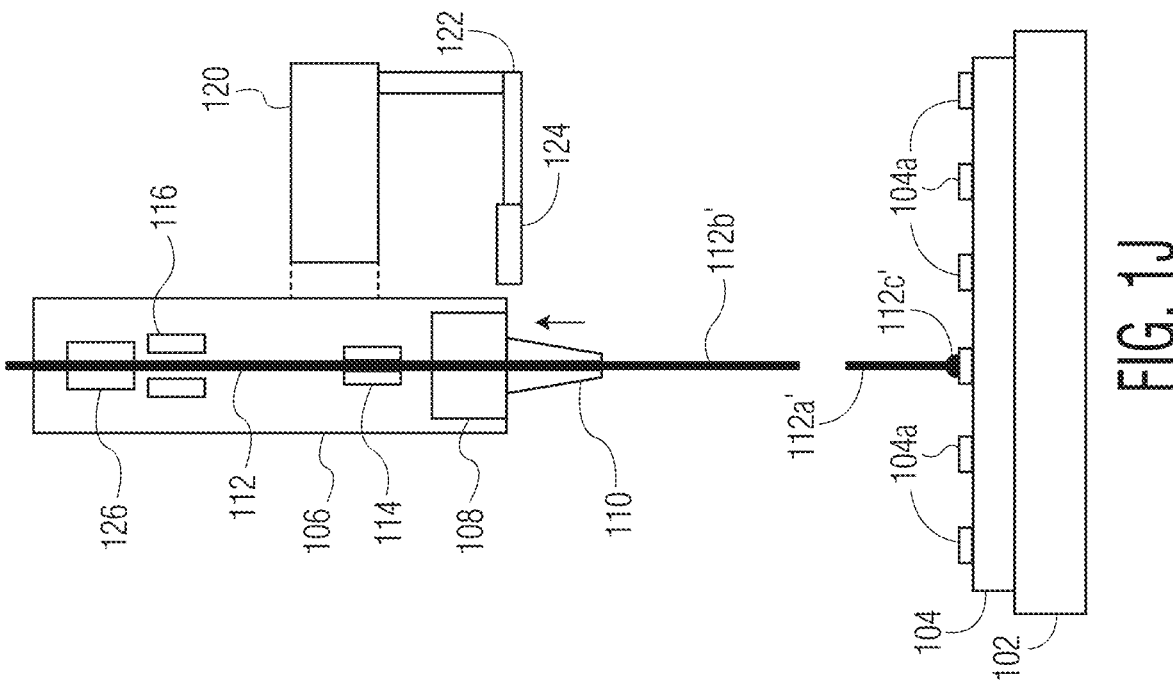
Figure 1J:
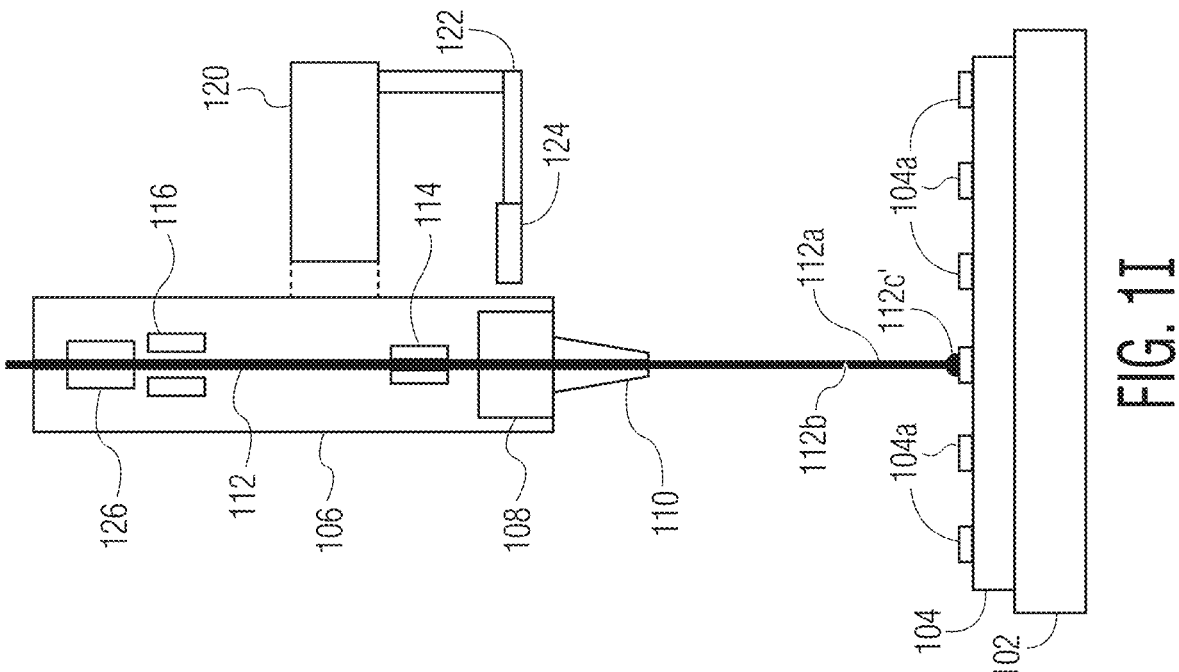

Referring now to FIG. 1G, wire bonding tool 110 has been moved down along the z-axis to bond FAB 112c (of FIG. 1F) to bond pad 104a. Transducer 108 provides ultrasonic energy (USG) to bond FAB 112c to bond pad 104a, thereby forming wire bond 112c'. Referring now to FIG. 1H, wire bonding tool 110 has moved up along the z-axis with both wire clamp 114 and wire clamp 116 in an open position. Referring now to FIG. 1I, wire clamp 114 of bond head assembly 106 has been closed, and at FIG. 1J, wire bonding tool 110 (along with wire clamp 114) is moved up along the z-axis, thereby breaking wire 112 at deformed portion 112*b*. Thus, a vertical wire structure 112*a'* is formed on bond pad 104*a*, and another end portion 112*b'* is shown below tip 110*a* of wire bonding tool 110.

Referring now to FIGS. 2A-2J, wire bonding system 100 is illustrated in connection with another embodiment. The description of certain elements of wire bonding system 100 in connection with FIGS. 1A-1J is applicable to FIGS. 2A-2J, unless indicated otherwise.

Figures 2A, 2B:
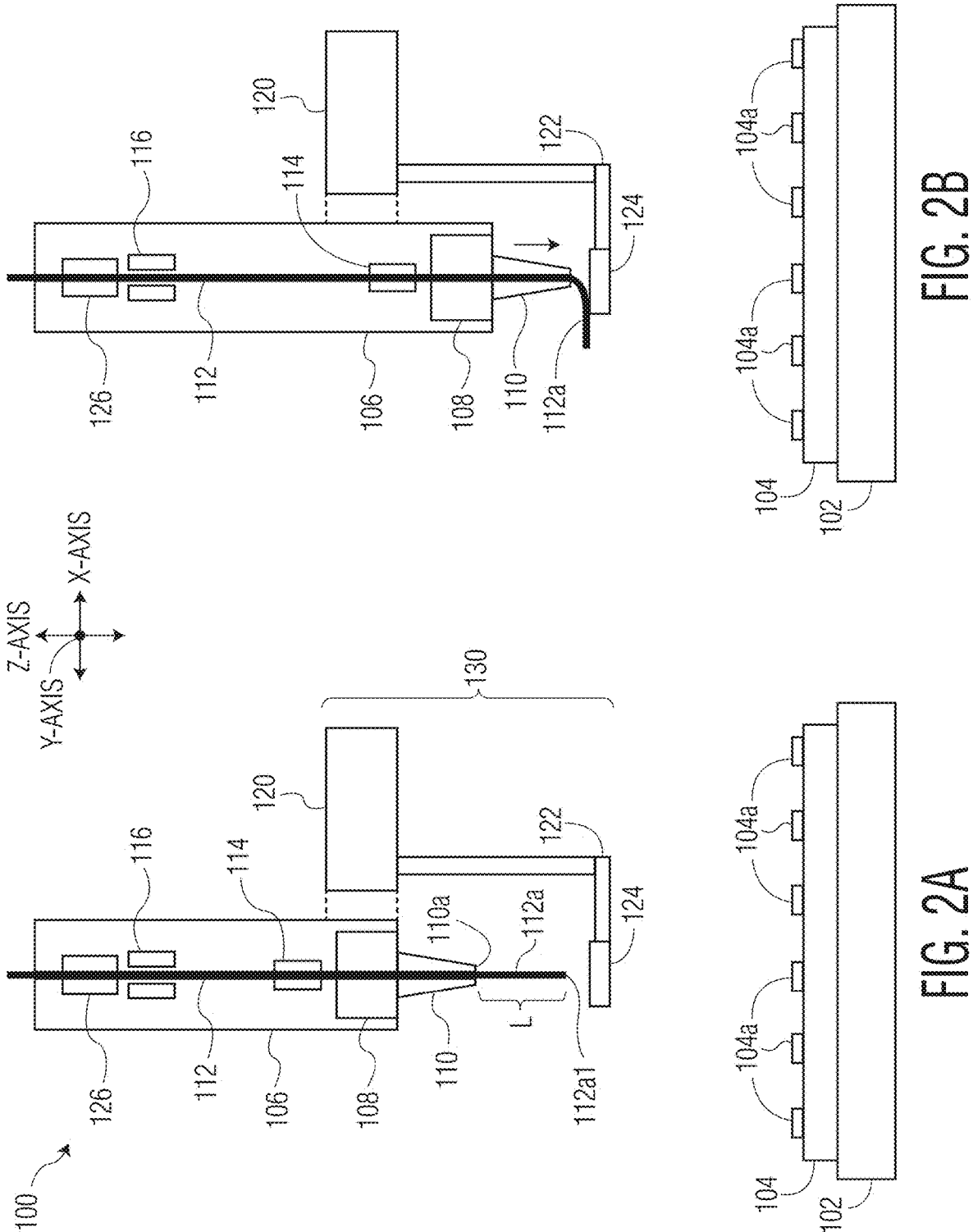

As illustrated in FIG. 2A, end portion 112*a* (e.g., a wire tail) of wire 112 has been advanced and/or provided such that a length L of wire (e.g., a length of a vertical wire structure including its associated formed bond) extends below tip 110*a* of wire bonding tool 110, terminating at end 112*a*1 of wire 112. Movable stage 124 is illustrated having been moved to a contact position beneath wire bonding tool 110 and end portion 112*a* (e.g., directly below end portion 112*a* as illustrated, indirectly below end portion 112*a*). For example, wire clamp 114 (illustrated in a closed position) may be used in connection with wire clamp 116 (illustrated in an open position) to advance end portion 112*a* to a desired length for a particular wire bonding operation (e.g., vertical wire structure formation).

In certain embodiments, in lieu of advancing end portion 112*a*, the length of end portion 112*a* below tip 110*a* of wire bonding tool 110 may be the result of a previously formed vertical wire structure (e.g., see end portion 112*b'* in FIG. 2J). In certain embodiments, the step of advancing end portion 112*a* includes (i) operating wire clamp 114 and wire clamp 116 of wire bonding system 100 in conjunction with (ii) moving of wire clamp 114 and wire bonding tool 110 along the z-axis of wire bonding system 100, to advance a length of wire (e.g., end portion 112*a*) below tip 110*a* of wire bonding tool 110. For example, the "operating" of wire clamp 114 and wire clamp 116 may be opening or closing the clamps, as desired, to advance wire 112.

Referring now to FIG. 2B, wire bonding tool 110 has been moved vertically (i.e., along the z-axis) down toward movable stage 124. End portion 112*a* has been bent (e.g., approximately perpendicular to the z-axis of wire bonding system 100), in preparation for a pressing and/or deforming operation illustrated in FIG. 2C. Of course, the bending of FIG. 2B and the pressing of FIG. 2C could be done simultaneously.

Figure 2C:
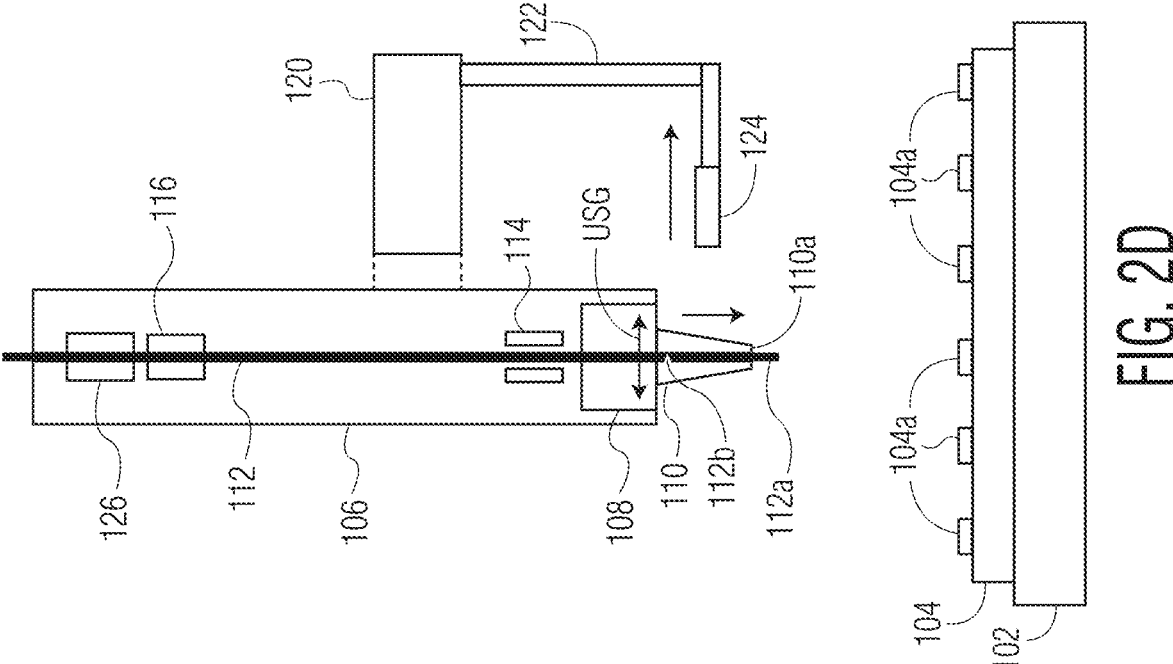
Figure 2C:
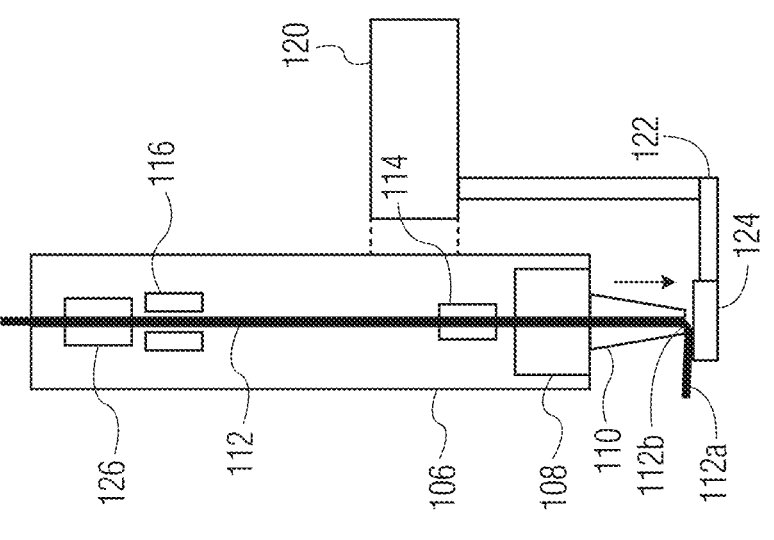

Referring now to FIG. 2C, wire bonding tool 110 has been moved vertically downward along the z-axis (along with wire clamp 114 and transducer 108), thereby pressing end portion 112*a* against movable stage 124. Thus, a deformed portion 112*b* (e.g., a thinned portion of wire, a partially severed portion of wire, etc.) of wire 112 has been formed (e.g., by tip 110*a* of wire bonding tool), and end portion 112*a* of wire 112 extends from the deformed portion 112*b*. During the pressing operation, wire clamp 114 is illustrated in a closed position and wire clamp 116 is illustrated in an open position.

Figure 2D:
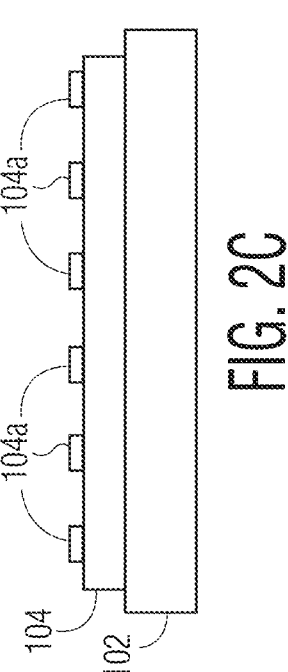

Referring now to FIG. 2D, wire bonding tool 110 has moved vertically downward along the z-axis with wire clamp 114 open and wire clamp 116 closed, thereby at least partially straightening end portion 112*a*. Transducer 108 is illustrated providing ultrasonic energy (i.e., USG) to assist in advancing and/or retreating length of wire 112 with respect to wire bonding tool 110 (it being understood that the application of USG is optional). In the illustrated embodiment, deformed portion 112*b* is shown now within the body of wire bonding tool 110, such that part of end portion 112*a* is also within the body of wire bonding tool 110, and another part of end portion 112*a* extends below a tip of wire bonding tool 110 as a wire tail. Movable stage 124 is illustrated moving (e.g., simultaneously, asynchronously, etc.) along the x-axis to a retracted position away from wire bonding tool 110.

Figure 2F:
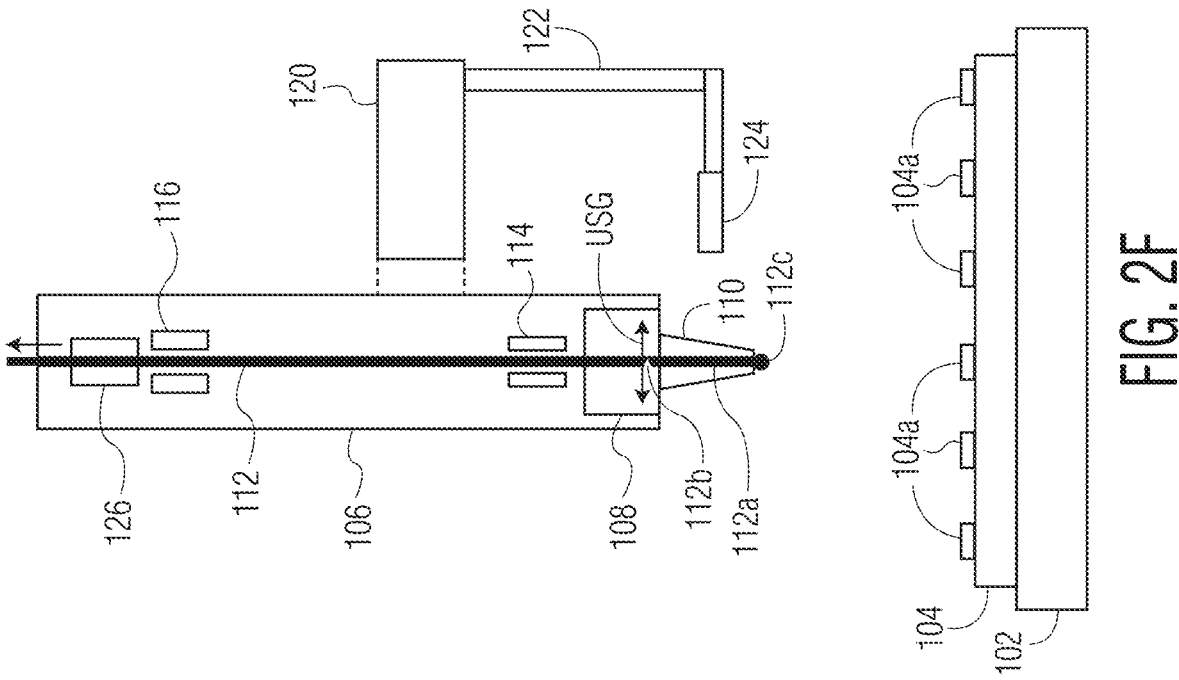
Figure 2E:
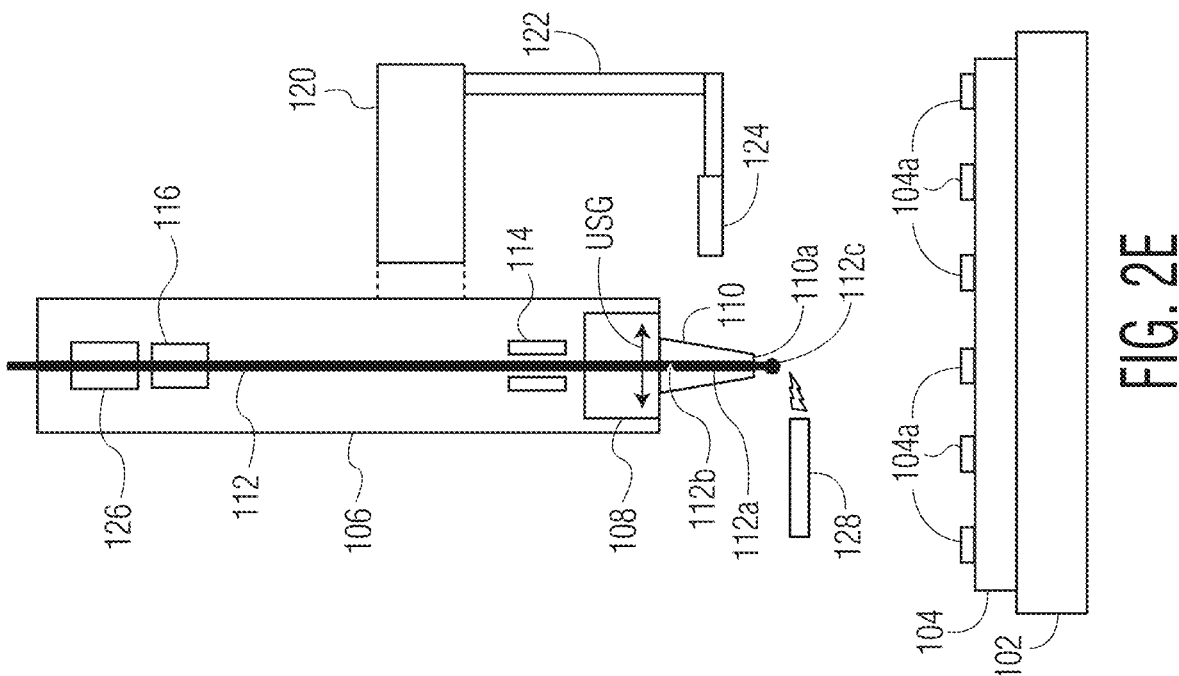

Referring now to FIG. 2E, EFO device 128 is in proximity to end portion 112*a* to form a free air ball 112*c* (FAB) on end portion 112*a*. Referring now to FIG. 2F, with wire clamp 114 and wire clamp 116 both open, FAB 112*c* is seated at tip 110*a* of wire bonding tool 110 using wire tensioner 126.

Figure 2H:
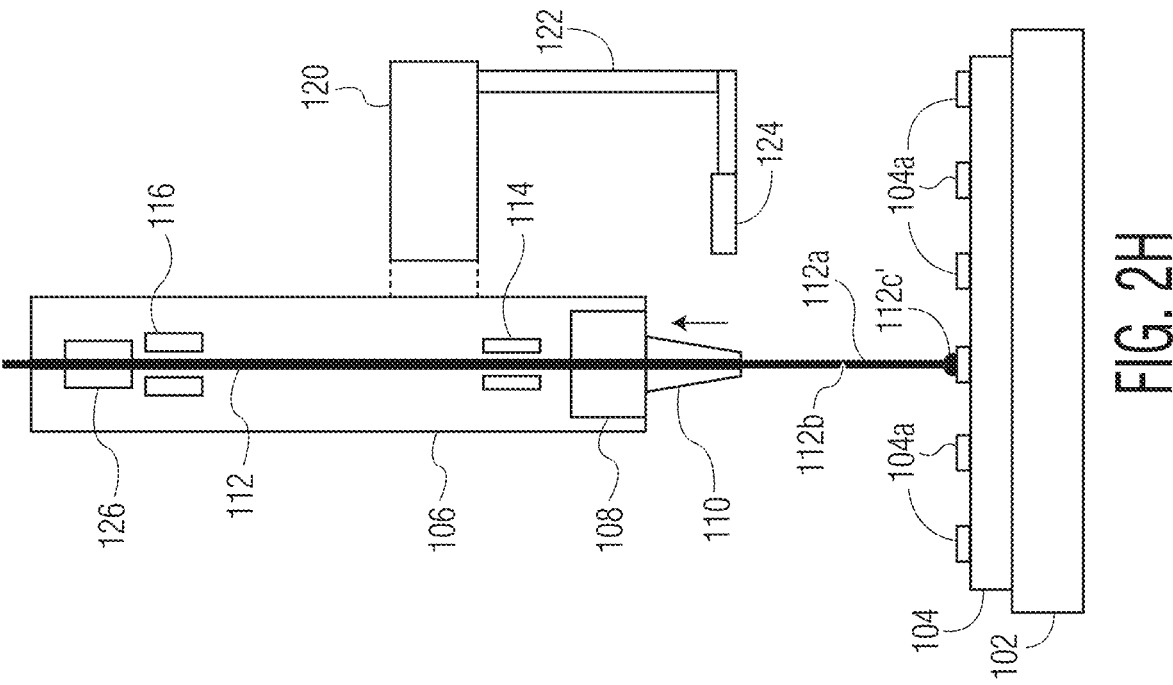
Figure 2G:
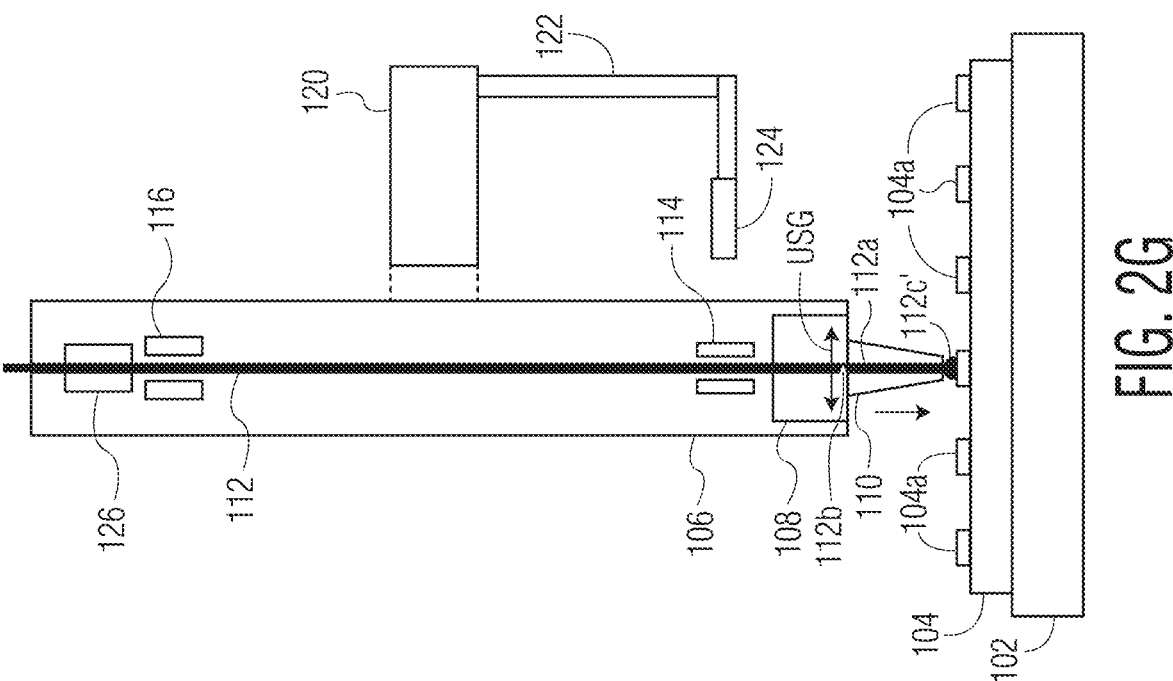
Figure 2J:
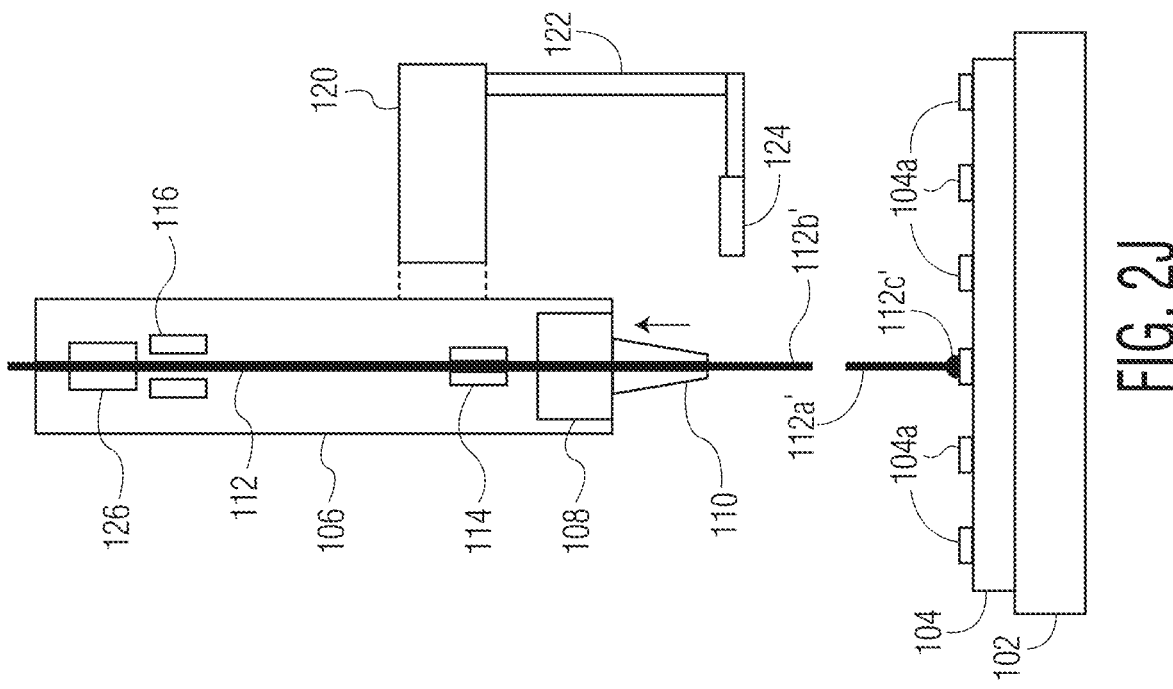
Figure 2I:
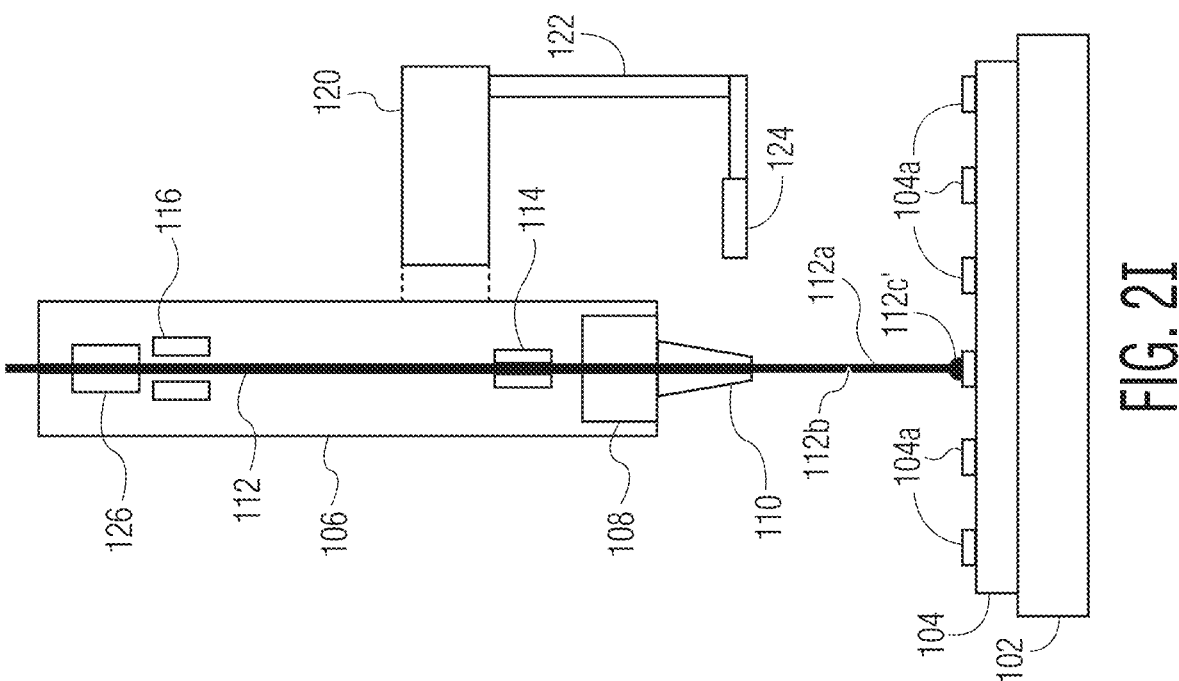

Referring now to FIG. 2G, wire bonding tool 110 has been moved down along the z-axis to bond FAB 112*c* (of FIG. 2F) to bond pad 104*a*. Transducer 108 provides ultrasonic energy (USG) to bond FAB 112*c* to bond pad 104*a*, thereby forming wire bond 112*c'*. Referring now to FIG. 2H, wire bonding tool 110 has moved up along the z-axis with both wire clamp 114 and wire clamp 116 in an open position. Referring now to FIG. 2I, wire clamp 114 of bond head assembly 106 has been closed, and at FIG. 2J, wire bonding tool 110 (along with wire clamp 114) is moved up along the z-axis, thereby breaking wire 112 at deformed portion 112*b*. Thus, a vertical wire structure 112*a'* is formed on bond pad 104*a*, and another end portion 112*b'* is shown below tip 110*a* of wire bonding tool 110.

Referring now to FIGS. 3A-3M, wire bonding system 100 is illustrated in connection with another embodiment. The description of certain elements of wire bonding system 100 in connection with FIGS. 1A-1J is applicable to FIGS. 3A-3M, unless indicated otherwise.

Figures 3A, 3B:
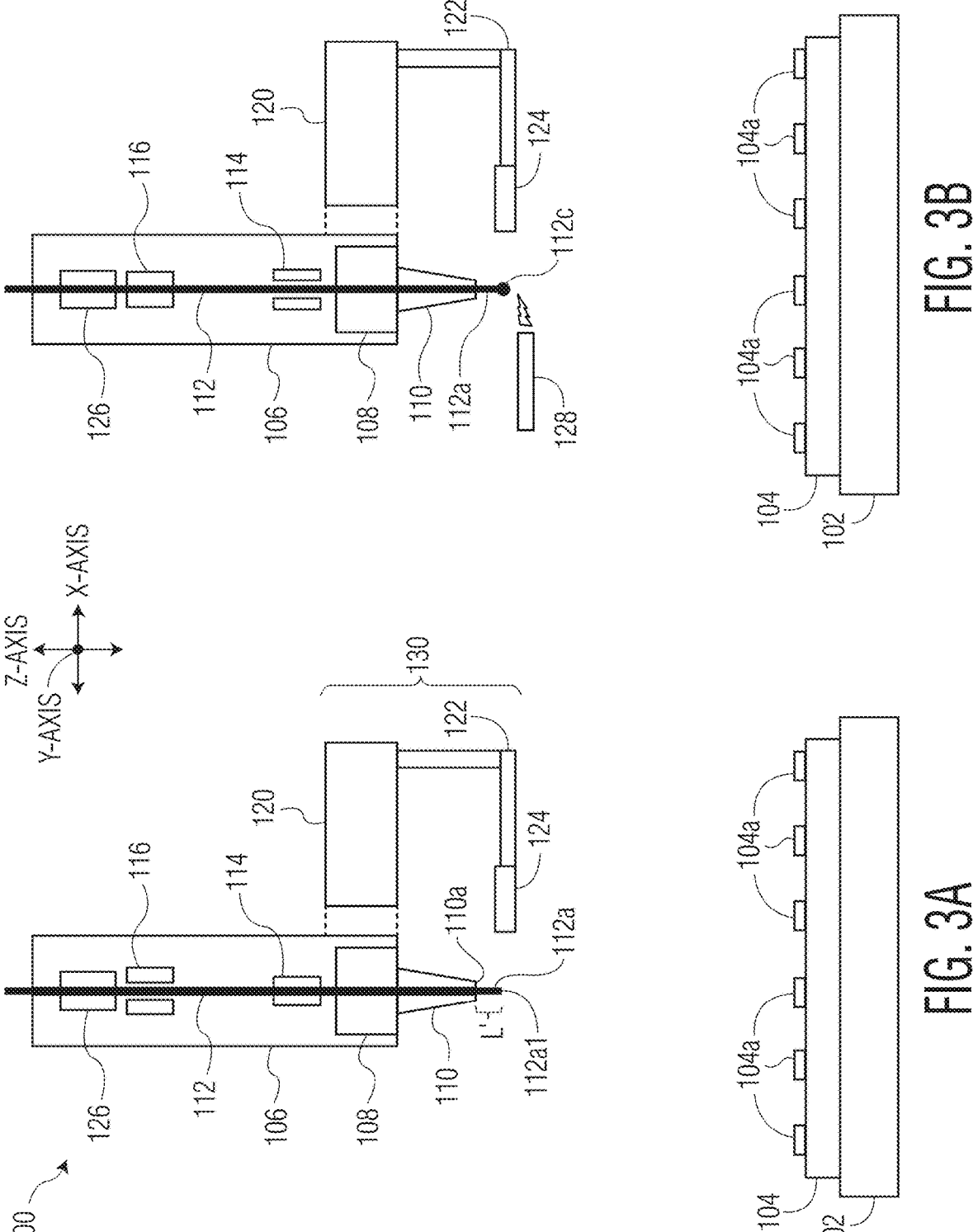

As illustrated in FIG. 3A, end portion 112*a* (e.g., a wire tail) of wire 112 has been advanced and/or provided such that a length L' of wire (e.g., a length for forming a FAB) extends below tip 110*a* of wire bonding tool 110, terminating at end 112*a*1 of wire 112. Movable stage 124 is illustrated at a retracted position. For example, wire clamp 114 (illustrated in a closed position) may be used in connection with wire clamp 116 (illustrated in an open position) to advance end portion 112*a* to a desired length for a particular wire bonding operation.

Figure 3C:
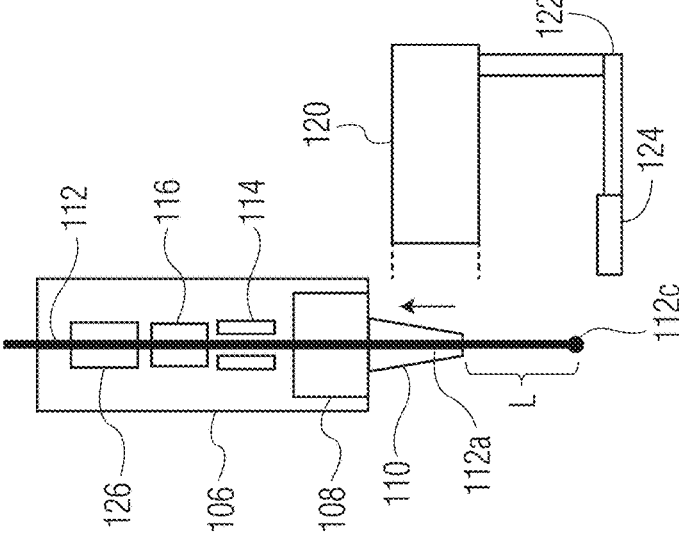
Figure 3C:
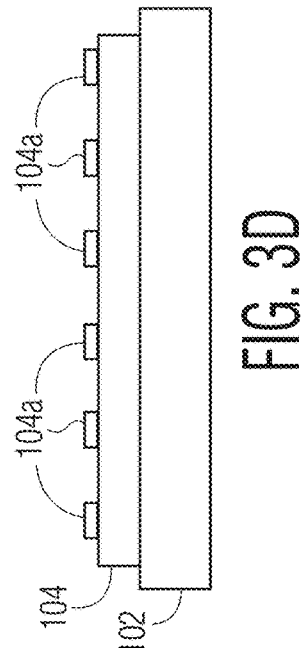

In certain embodiments, in lieu of advancing end portion 112*a*, the length of end portion 112*a* below tip 110*a* of wire bonding tool 110 may be the result of a previously formed vertical wire structure (e.g., see end portion 112*b'* in FIG. 3M). In certain embodiments, the step of advancing end portion 112*a* includes (i) operating wire clamp 114 and wire clamp 116 of wire bonding system 100 in conjunction with (ii) moving of wire clamp 114 and wire bonding tool 110 along the z-axis of wire bonding system 100, to advance a length of wire (e.g., end portion 112*a*) below tip 110*a* of wire bonding tool 110. For example, the "operating" of wire clamp 114 and wire clamp 116 may be opening or closing the clamps, as desired, to advance wire 112.

Referring now to FIG. 3B, EFO device 128 is in proximity to end portion 112*a* to form a free air ball 112*c* (FAB) on end portion 112*a*. Referring now to FIG. 3C, with wire clamp 114 and wire clamp 116 both open, FAB 112*c* is seated at tip 110*a* of wire bonding tool 110 using wire tensioner 126.

Figure 3D:
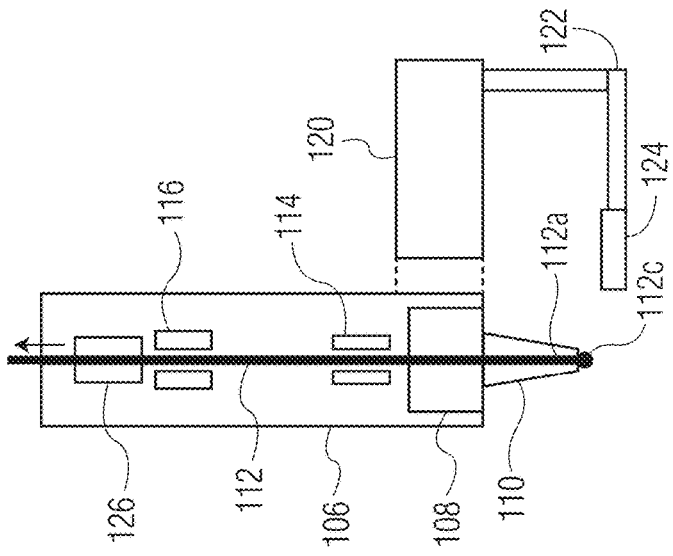
Figure 3D:
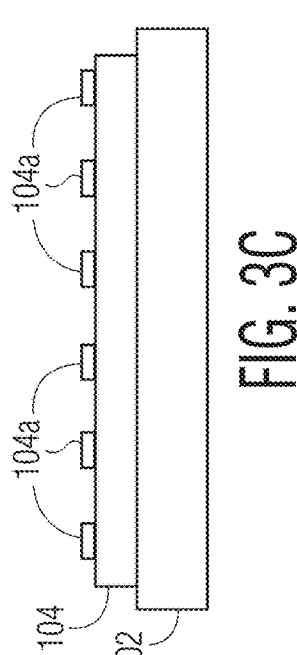

Referring now to FIG. 3D, wire bonding tool 110 has been moved vertically (i.e., along the z-axis) upward, with wire clamp 116 closed and wire clamp 114 open to advance end portion 112*a* of wire 112 below tip 110*a* of wire bonding tool 110. Thus, end portion 112*a* has been provided at a length L (e.g., a length of a vertical wire structure and including its associated formed bond).

Figure 3F:
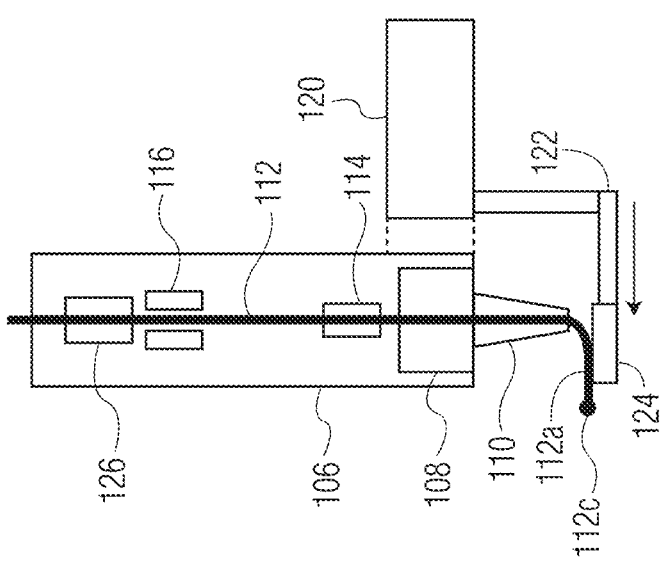
Figure 3F:
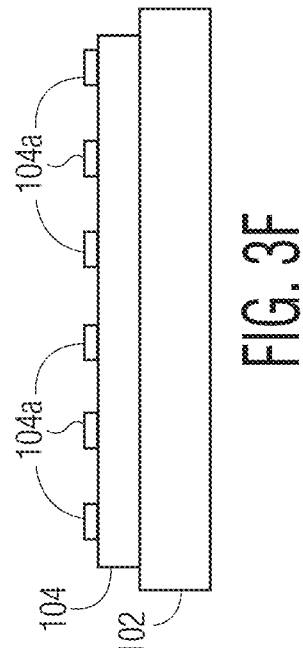
Figure 3E:
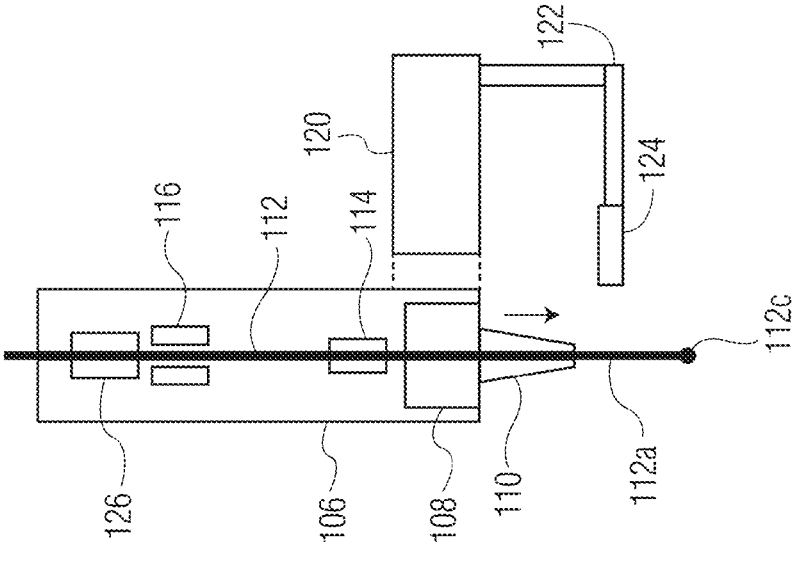
Figure 3E:
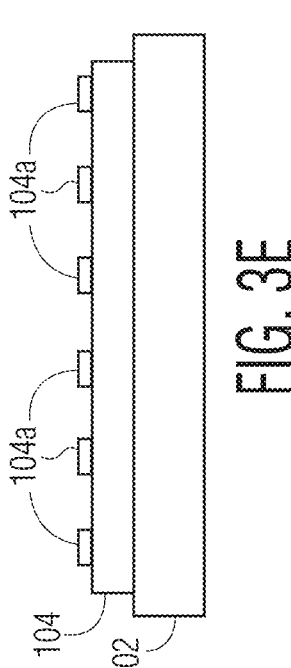
Figure 3H:
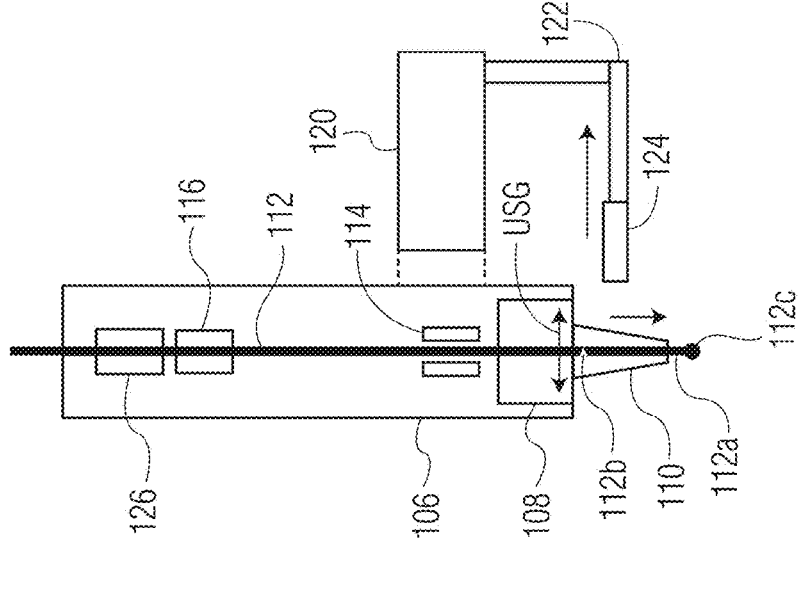
Figure 3H:
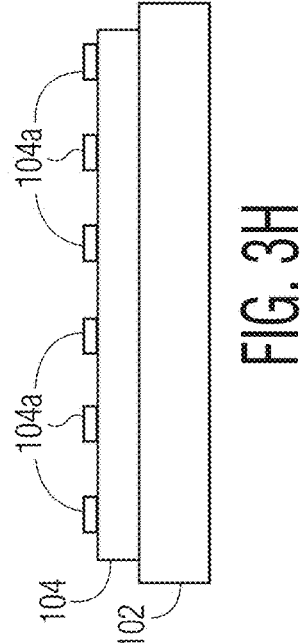

Referring now to FIG. 3E, wire bonding tool 110 has been moved vertically downward along the z-axis (along with wire clamp 114 and transducer 108), with wire clamp 114 closed and wire clamp 116 open. Referring now to FIG. 3F, movable stage 124 has been moved laterally along the xy plane (including motion along the x-axis as illustrated) to a contact position, thereby contacting a side of end portion 112*a* of wire 112. End portion 112*a* has been bent (e.g., approximately perpendicular to the z-axis of wire bonding system 100), in preparation for a pressing and/or deforming operation illustrated in FIG. 3G. Of course, the bending of FIG. 3F and the pressing of FIG. 3G could be done simultaneously.

Figure 3G:
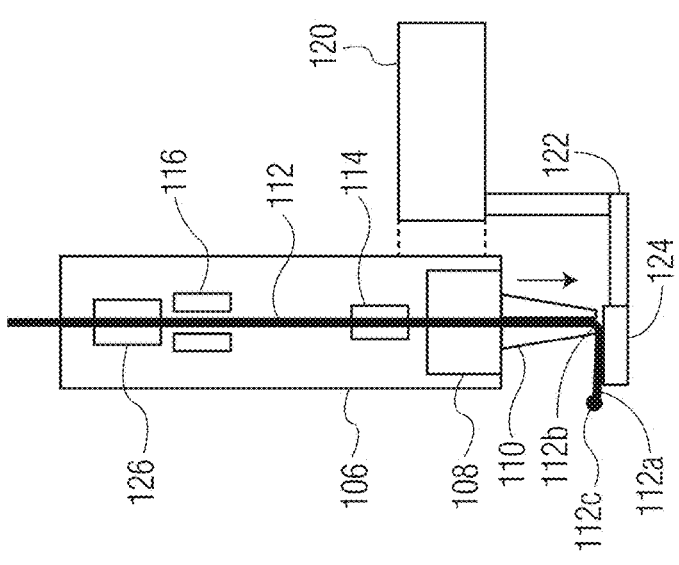
Figure 3G:
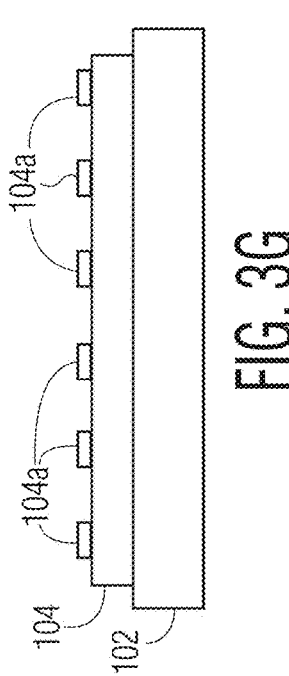

Referring now to FIG. 3G, wire bonding tool 110 has been moved vertically downward along the z-axis (along with wire clamp 114 and transducer 108), thereby pressing end portion 112*a* against movable stage 124. Thus, a deformed portion 112*b* (e.g., a thinned portion of wire, a partially severed portion of wire, etc.) of wire 112 has been formed (e.g., by tip 110*a* of wire bonding tool, etc.), and end portion 112*a* of wire 112 extends from the deformed portion 112*b*. During the pressing operation, wire clamp 114 is illustrated in a closed position and wire clamp 116 is illustrated in an open position.

Referring now to FIG. 3H, wire bonding tool 110 has moved vertically downward along the z-axis with wire clamp 114 open and wire clamp 116 closed, thereby at least partially straightening end portion 112*a*. Transducer 108 is illustrated providing ultrasonic energy (i.e., USG) to assist in advancing and/or retreating length of wire 112 with respect to wire bonding tool 110 (it being understood that the application of USG is optional) (e.g., retreating illustrated in FIG. 3H). In the illustrated embodiment, deformed portion 112*b* is shown now within the body of wire bonding tool 110, such that part of end portion 112*a* is also within the body of wire bonding tool 110, and another part of end portion 112*a* extends below a tip of wire bonding tool 110 as a wire tail. Movable stage 124 is illustrated moving (e.g., simultaneously, asynchronously, etc.) along the x-axis to a retracted position away from wire bonding tool 110.

Figure 3J:
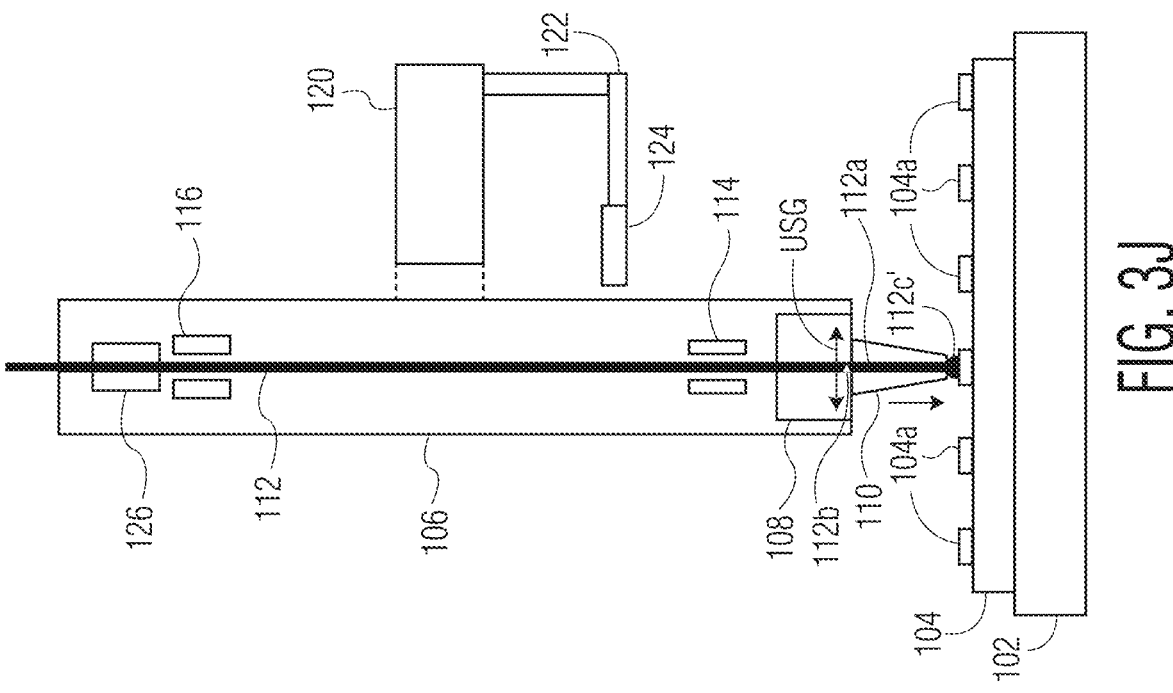
Figure 3I:
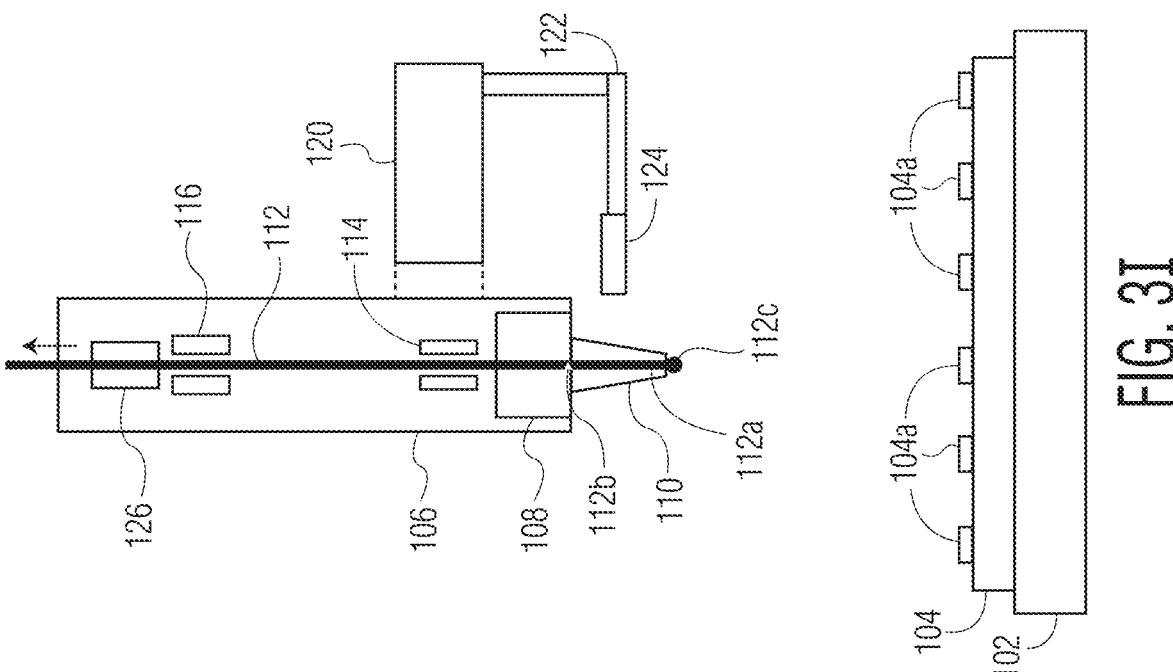
Figure 3L:
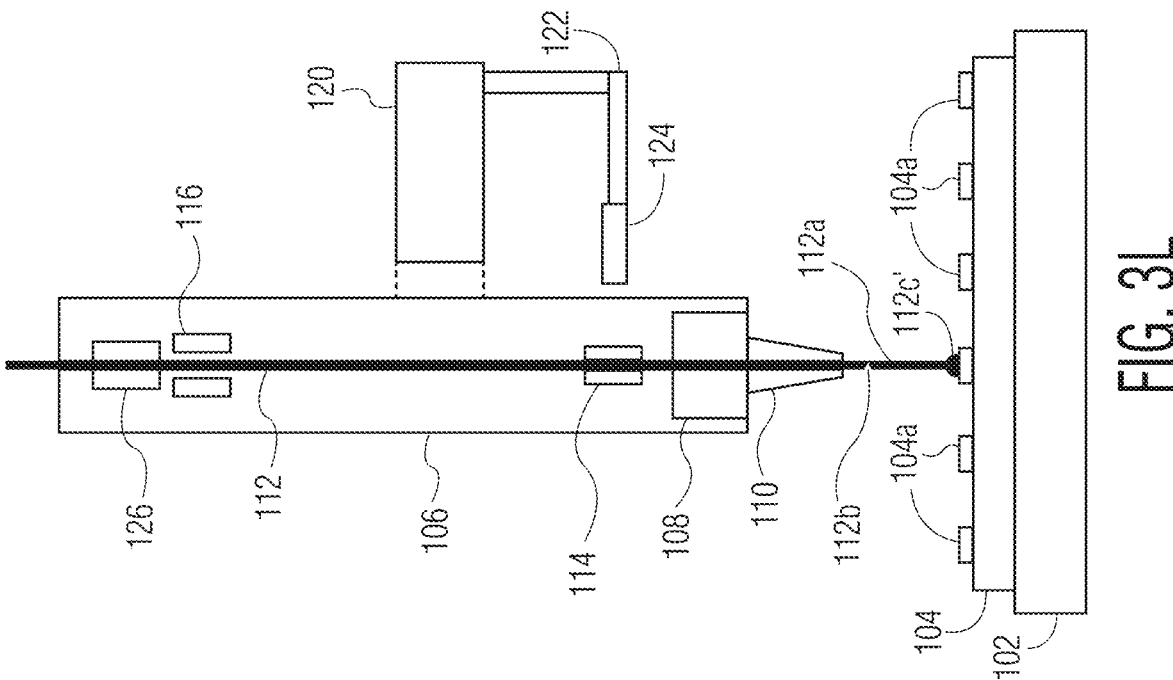
Figure 3K:
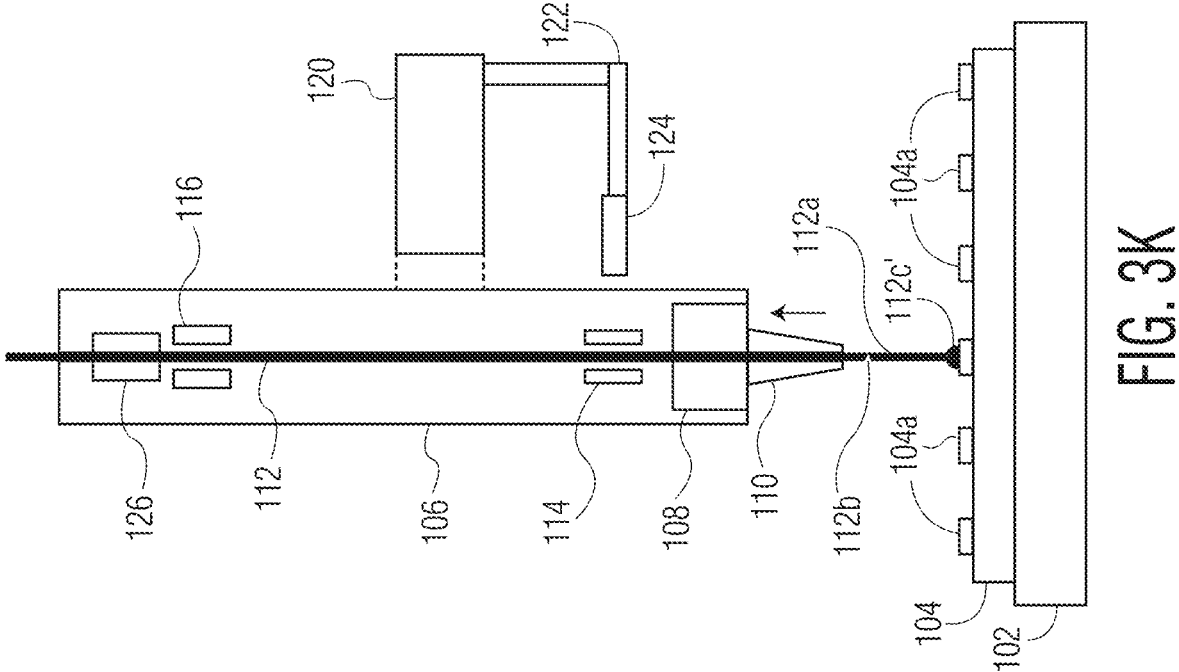
Figure 3M:
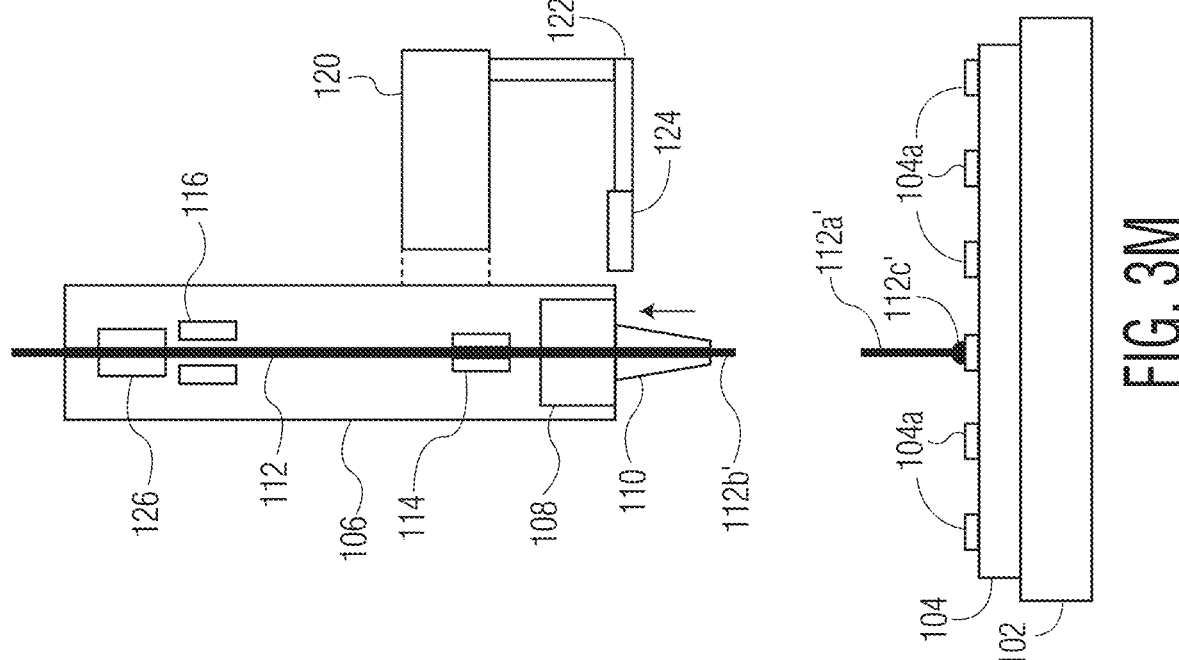

Referring now to FIG. 3I, with wire clamp 114 and wire clamp 116 both open, FAB 112*c* is seated at tip 110*a* of wire bonding tool 110 using wire tensioner 126. Referring now to FIG. 3J, wire bonding tool 110 has been moved down along the z-axis to bond FAB 112*c* (of FIG. 3I) to bond pad 104*a*. Transducer 108 provides ultrasonic energy (USG) to bond FAB 112*c* to bond pad 104*a*, thereby forming wire bond 112*c'*. Referring now to FIG. 3K, wire bonding tool 110 has moved up along the z-axis with both wire clamp 114 and wire clamp 116 in an open position. Referring now to FIG. 3L, wire clamp 114 of bond head assembly 106 has been closed, and at FIG. 3M, wire bonding tool 110 (along with wire clamp 114) is moved up along the z-axis, thereby breaking wire 112 at deformed portion 112*b*. Thus, a vertical wire structure 112*a'* is formed on bond pad 104*a*, and another end portion 112*b'* is shown below tip 110*a* of wire bonding tool 110.

Referring now to FIGS. 4A-4M, wire bonding system 100 is illustrated in connection with another embodiment. The description of certain elements of wire bonding system 100 in connection with FIGS. 1A-1J is applicable to FIGS. 4A-4M, unless indicated otherwise.

Figures 4A, 4B:
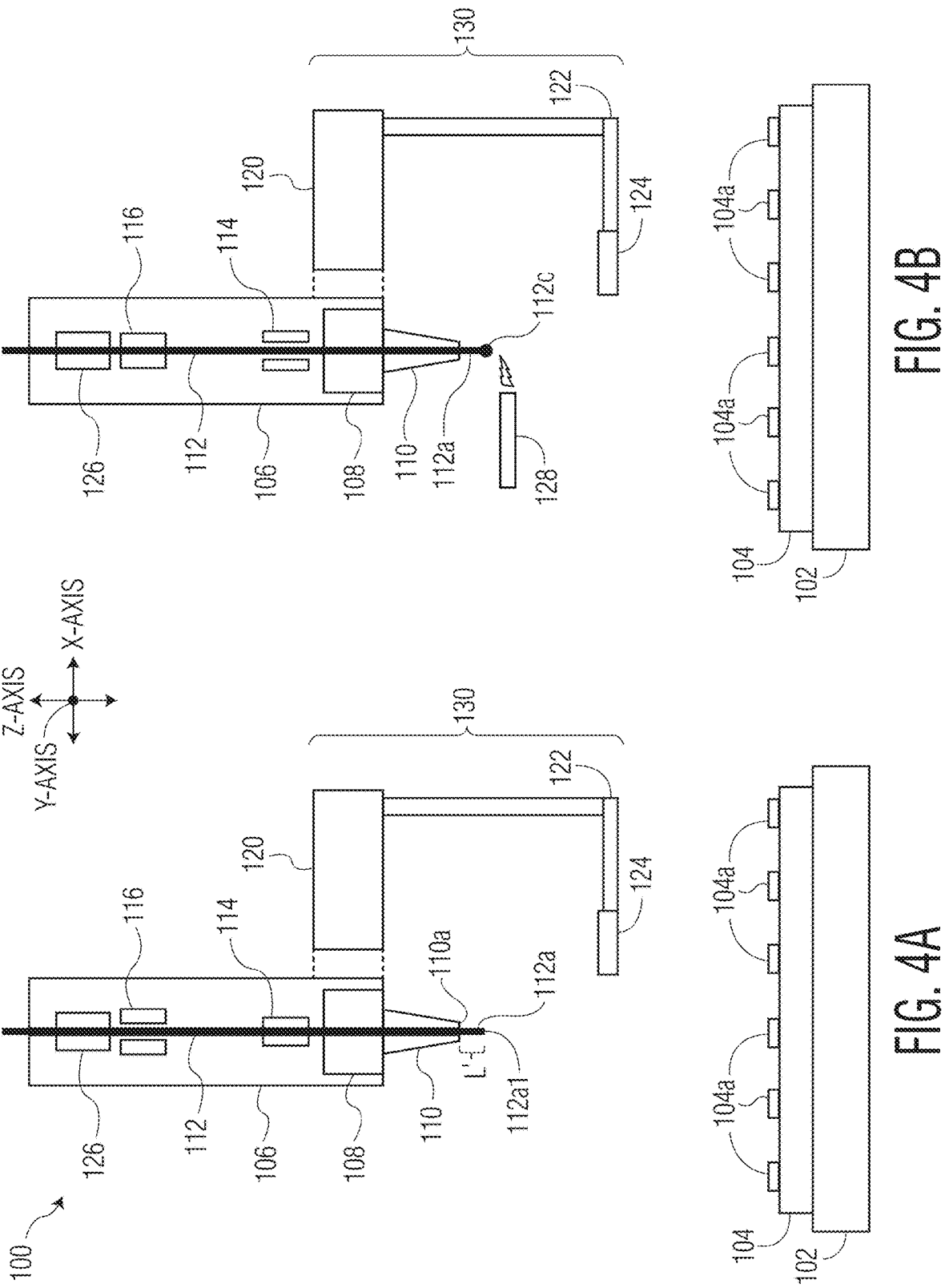

As illustrated in FIG. 4A, end portion 112*a* (e.g., a wire tail) of wire 112 has been advanced and/or provided such that a length L' of wire (e.g., a length for forming a FAB) extends below tip 110*a* of wire bonding tool 110, terminating at end 112*a*1 of wire 112. Movable stage 124 is illustrated at a retracted position. For example, wire clamp 114 (illustrated in a closed position) may be used in connection with wire clamp 116 (illustrated in an open position) to advance end portion 112*a* to a desired length for a particular wire bonding operation.

Figures 4C, 4D:
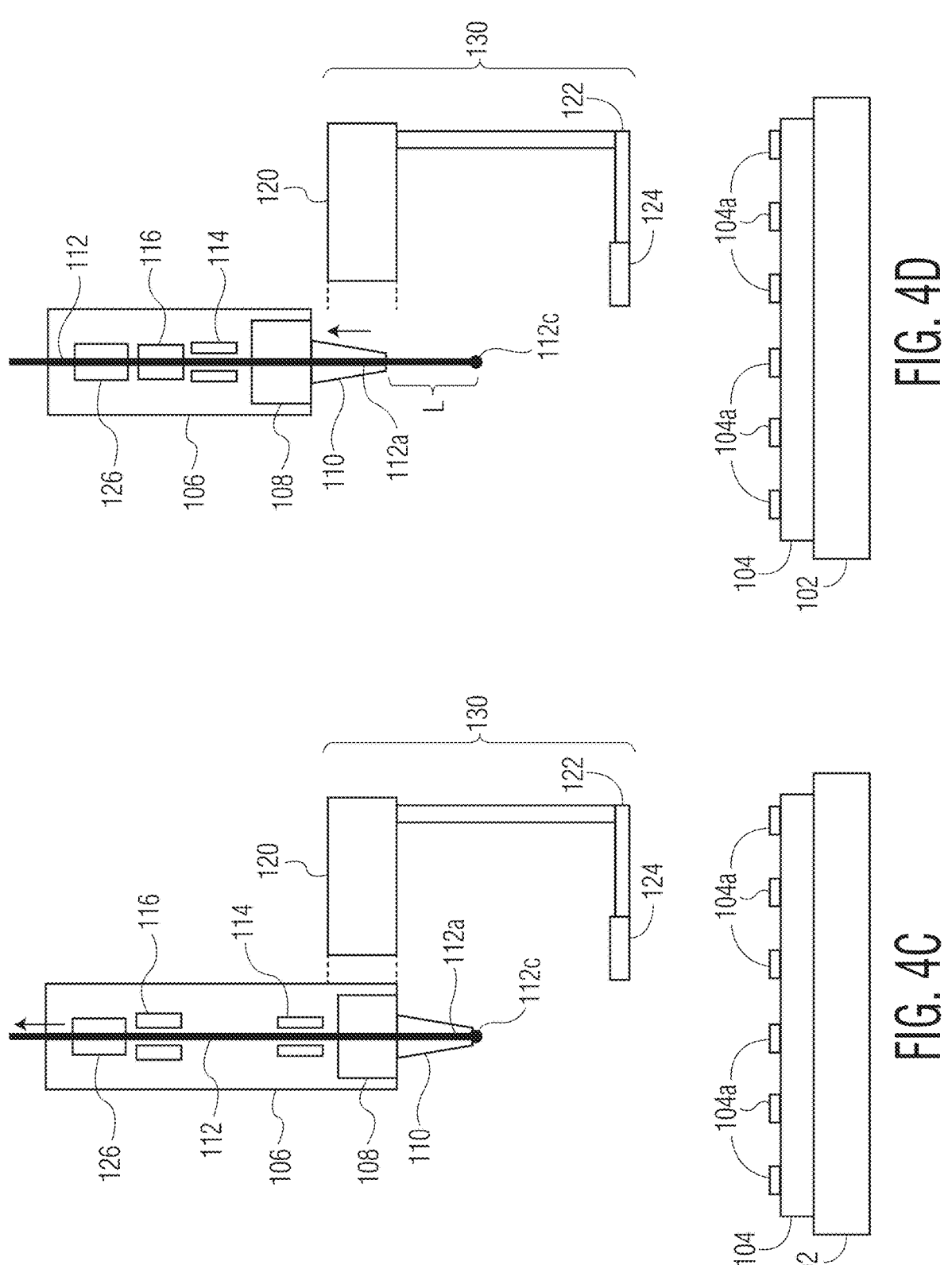
Figure 4F:
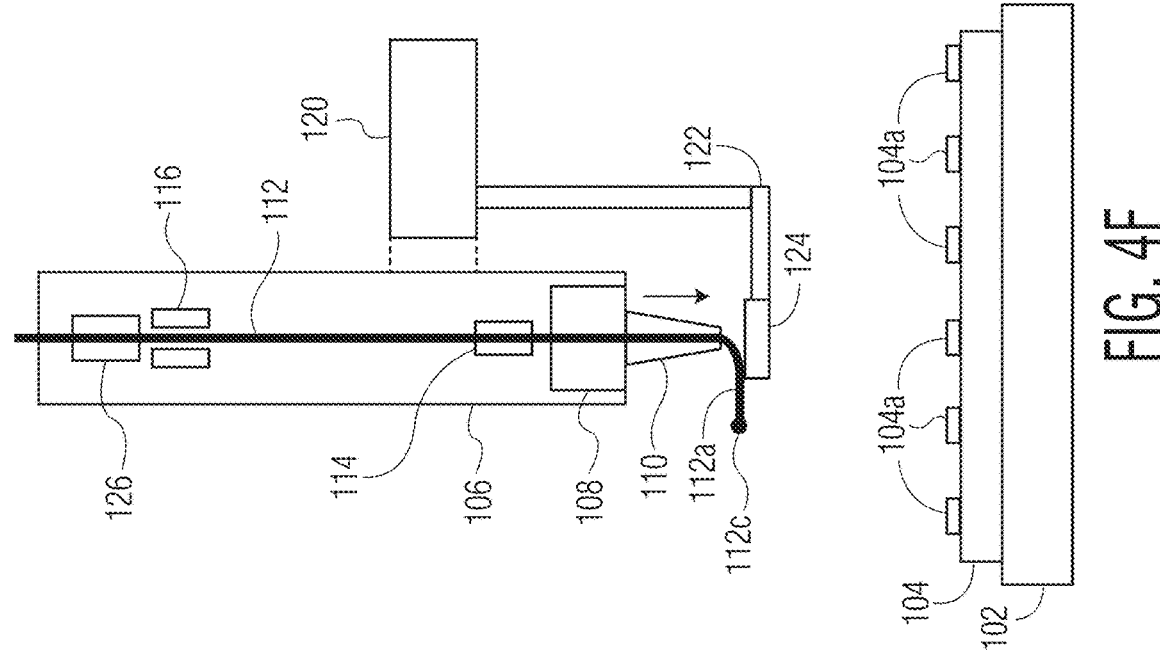

In certain embodiments, in lieu of advancing end portion 112*a*, the length of end portion 112*a* below tip 110*a* of wire bonding tool 110 may be the result of a previously formed vertical wire structure (e.g., see end portion 112*b'* in FIG. 4M). In certain embodiments, the step of advancing end portion 112*a* includes (i) operating wire clamp 114 and wire clamp 116 of wire bonding system 100 in conjunction with (ii) moving of wire clamp 114 and wire bonding tool 110 along the z-axis of wire bonding system 100, to advance a length of wire (e.g., end portion 112*a*) below tip 110*a* of wire bonding tool 110. For example, the "operating" of wire clamp 114 and wire clamp 116 may be opening or closing the clamps, as desired, to advance wire 112.

Referring now to FIG. 4B, EFO device 128 is in proximity to end portion 112*a* to form a free air ball 112*c* (FAB) on end portion 112*a*. Referring now to FIG. 4C, with wire clamp 114 and wire clamp 116 both open, FAB 112*c* is seated at tip 110*a* of wire bonding tool 110 using wire tensioner 126.

Referring now to FIG. 4D, wire bonding tool 110 has been moved vertically (i.e., along the z-axis) upward, with wire clamp 116 closed and wire clamp 114 open to advance end portion 112*a* of wire 112 below tip 110*a* of wire bonding tool 110. Thus, end portion 112*a* has been provided at a length L (e.g., a length of a vertical wire structure and including its associated formed bond).

Figure 4E:
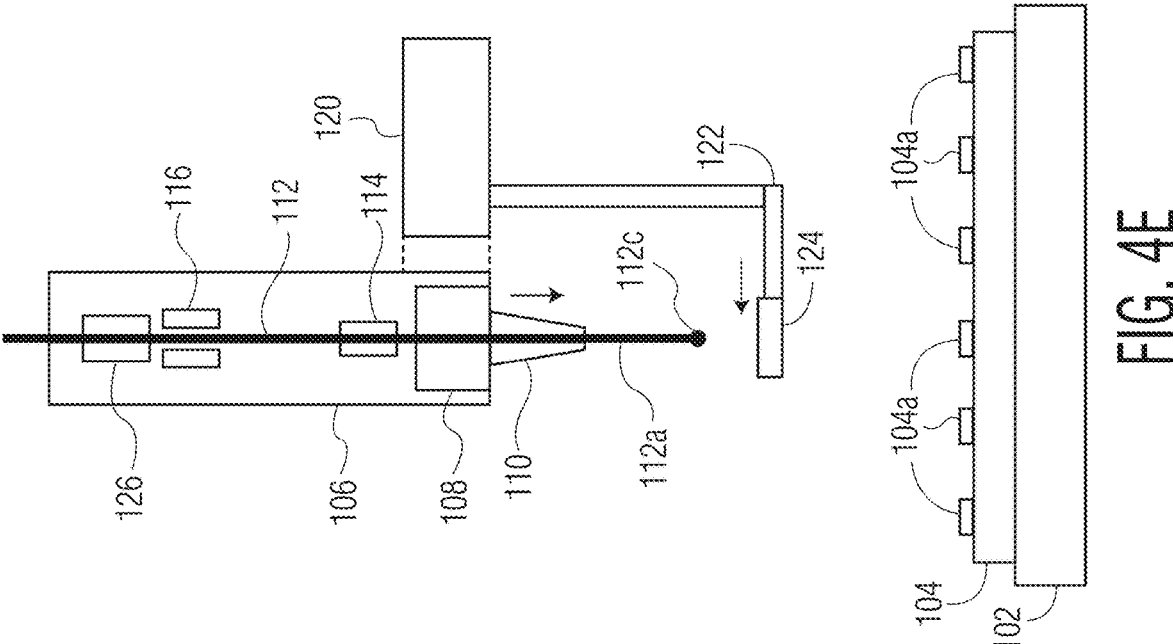
Figure 4H:
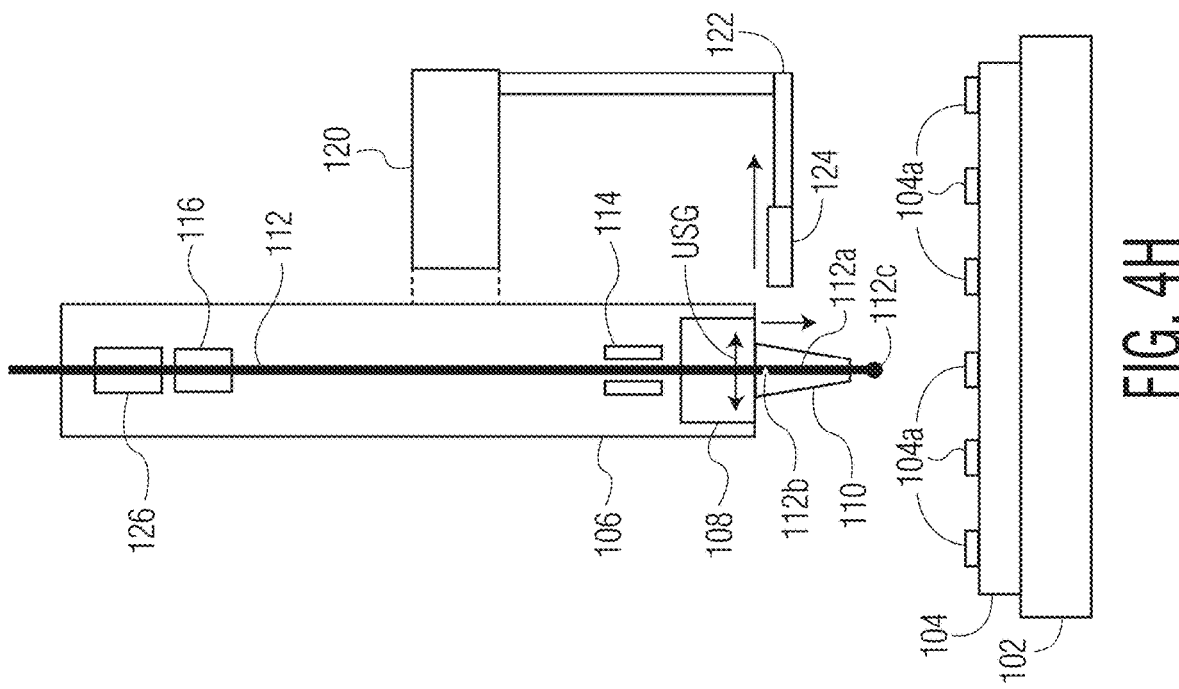

Referring now to FIG. 4E, movable stage 124 has been moved to a contact position beneath wire bonding tool 110 and end portion 112*a* (e.g., directly below end portion 112*a* as illustrated, indirectly below end portion 112*a*). Wire bonding tool 110 has been moved vertically downward along the z-axis (along with wire clamp 114 and transducer 108) toward movable stage 124 (with wire clamp 114 closed and wire clamp 116 open). Referring now to FIG. 4F, wire bonding tool 110 has been further moved vertically downward along the z-axis (along with wire clamp 114 and transducer 108) toward movable stage 124 (with wire clamp 114 closed and wire clamp 116 open) and end portion 112*a* has been bent (e.g., approximately perpendicular to the z-axis of wire bonding system 100), in preparation for a pressing and/or deforming operation illustrated in FIG. 4G. Of course, the bending of FIG. 4F and the pressing of FIG. 4G could be done simultaneously.

Figure 4G:
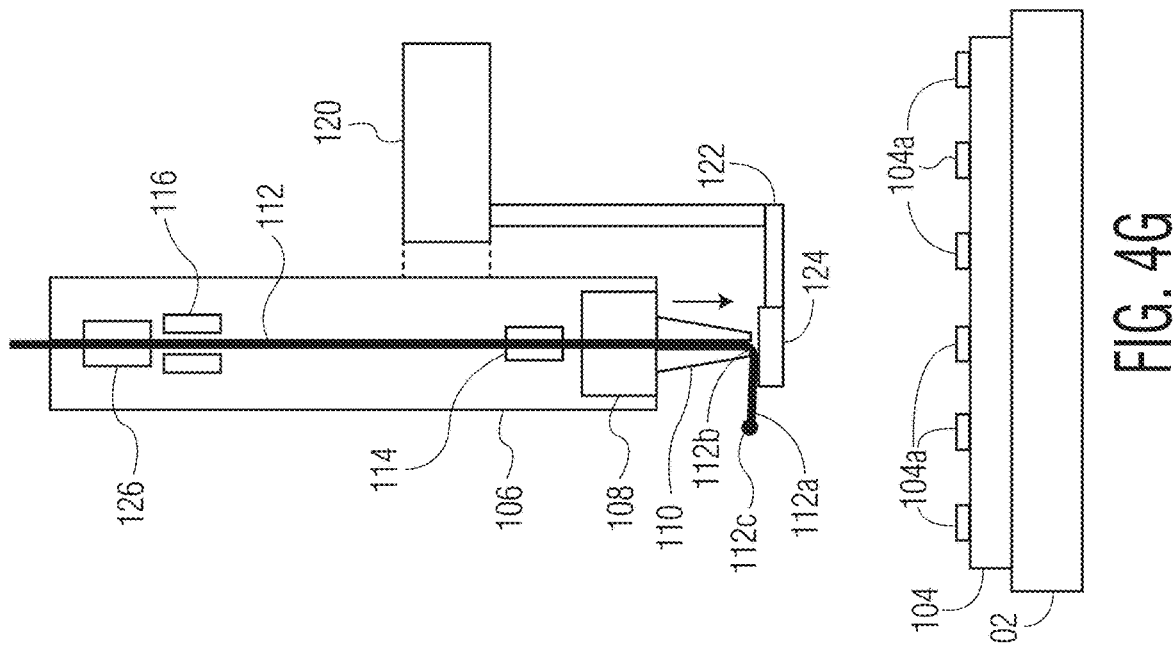

Referring now to FIG. 4G, wire bonding tool 110 has been moved vertically downward along the z-axis (along with wire clamp 114 and transducer 108), thereby pressing end portion 112*a* against movable stage 124. Thus, a deformed portion 112*b* (e.g., a thinned portion of wire, a partially severed portion of wire, etc.) of wire 112 has been formed (e.g., by tip 110*a* of wire bonding tool, etc.), and end portion 112*a* of wire 112 extends from the deformed portion 112*b*. During the pressing operation, wire clamp 114 is illustrated in a closed position and wire clamp 116 is illustrated in an open position.

Referring now to FIG. 4H, wire bonding tool 110 has moved vertically downward along the z-axis with wire clamp 114 open and wire clamp 116 closed, thereby at least partially straightening end portion 112*a*. Transducer 108 is illustrated providing ultrasonic energy (i.e., USG) to assist in advancing and/or retreating length of wire 112 with respect to wire bonding tool 110 (it being understood that the application of USG is optional). In the illustrated embodiment, deformed portion 112*b* is shown now within the body of wire bonding tool 110, such that part of end portion 112*a* is also within the body of wire bonding tool 110, and another part of end portion 112a extends below a tip of wire bonding tool 110 as a wire tail. Movable stage 124 is illustrated moving (e.g., simultaneously, asynchronously, etc.) along the x-axis to a retracted position away from wire bonding tool 110.

Figure 4J:
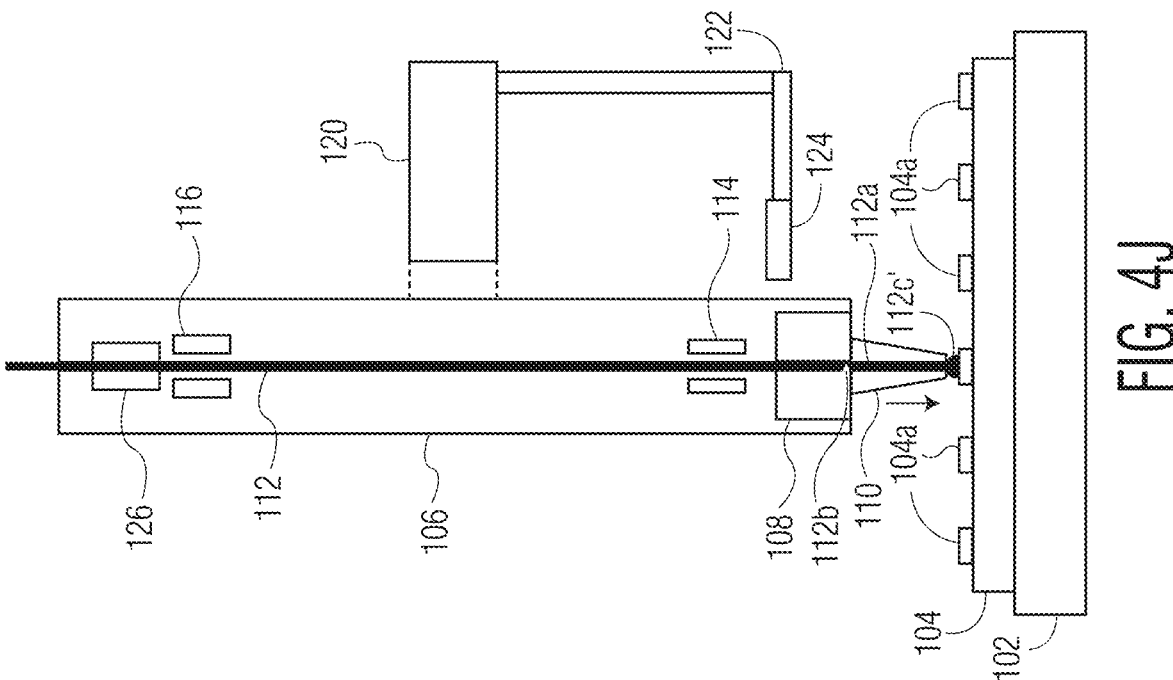
Figure 4I:
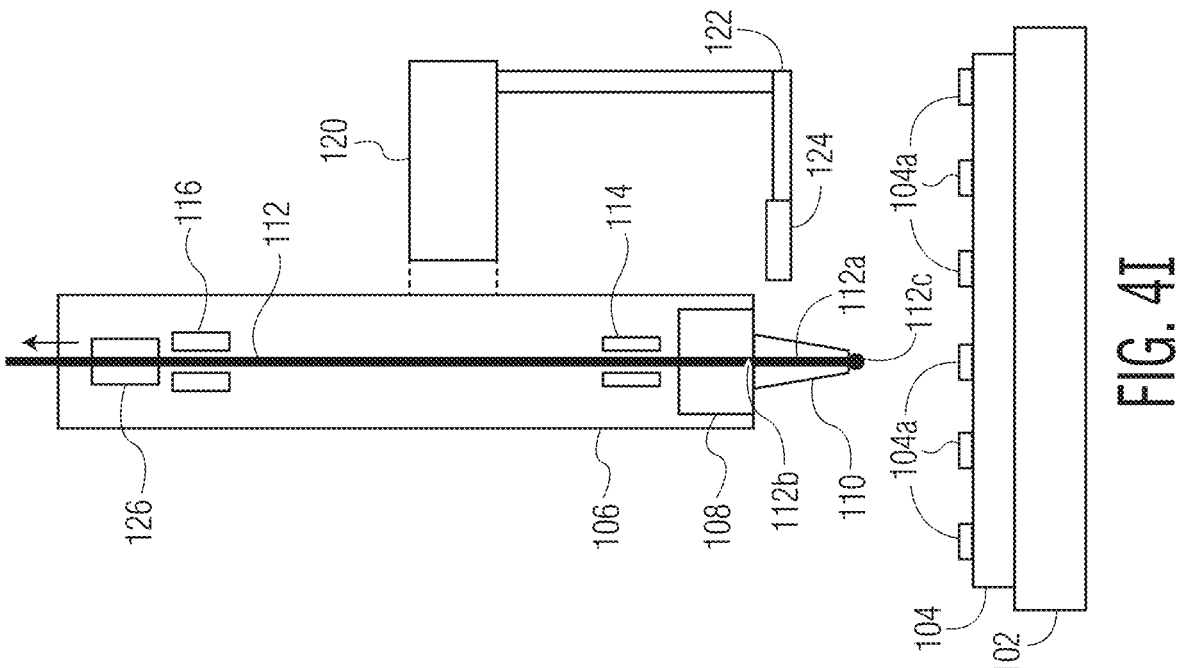
Figure 4L:
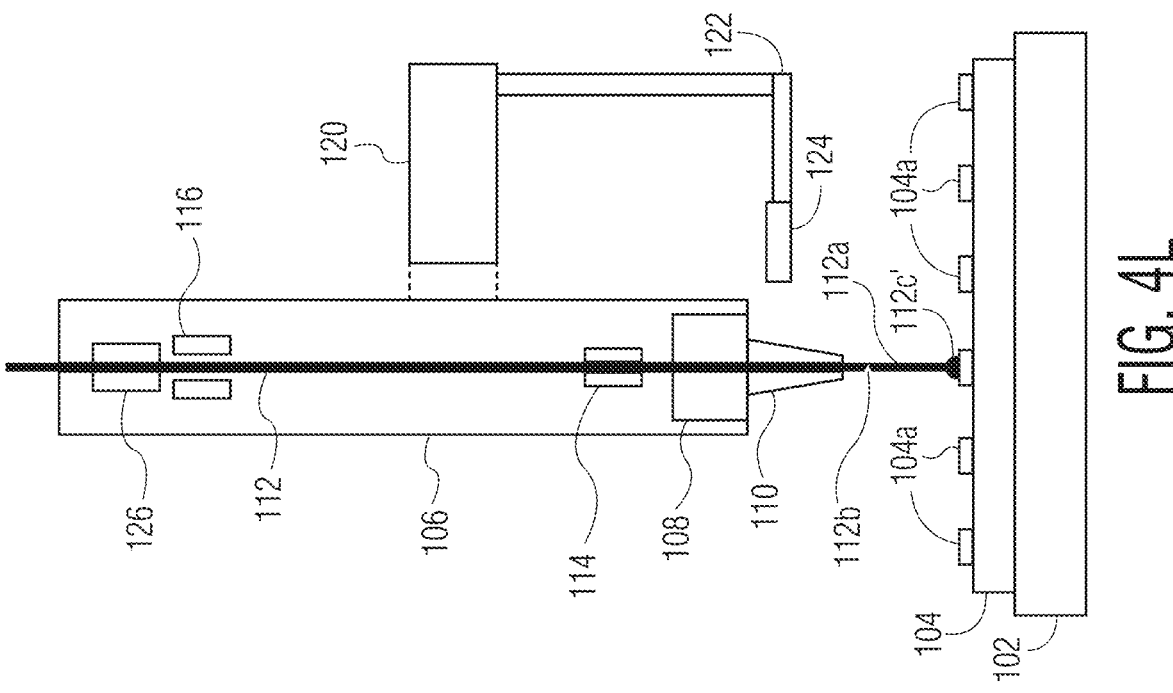
Figure 4K:
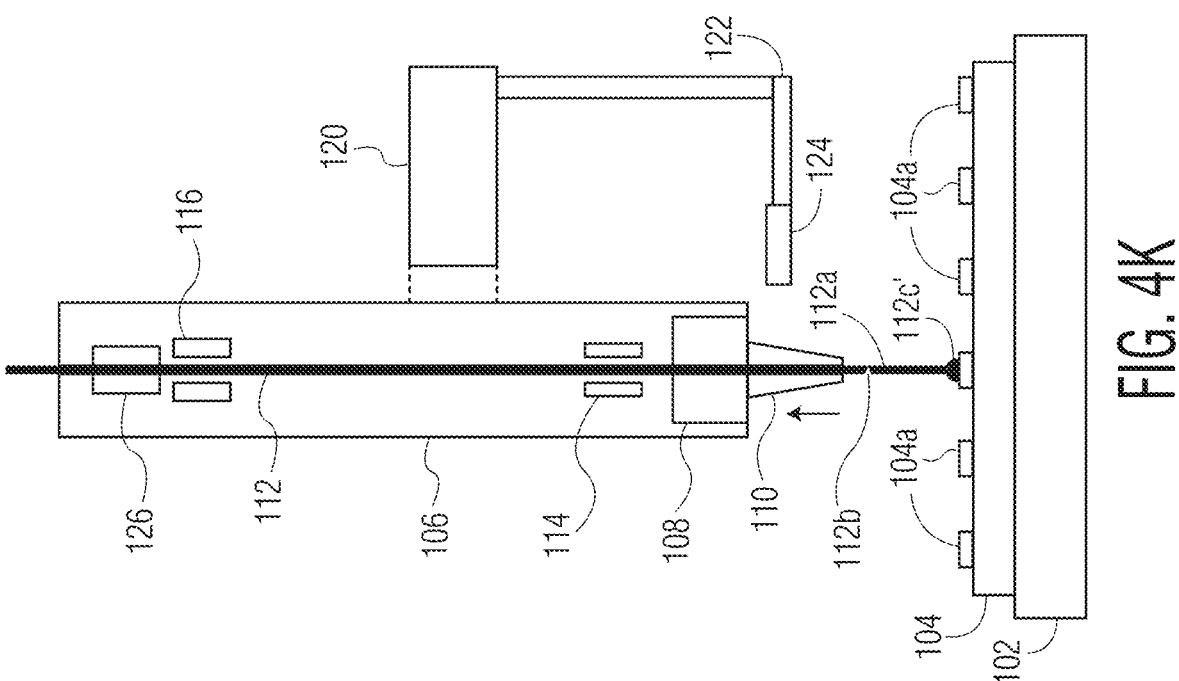
Figure 4M:
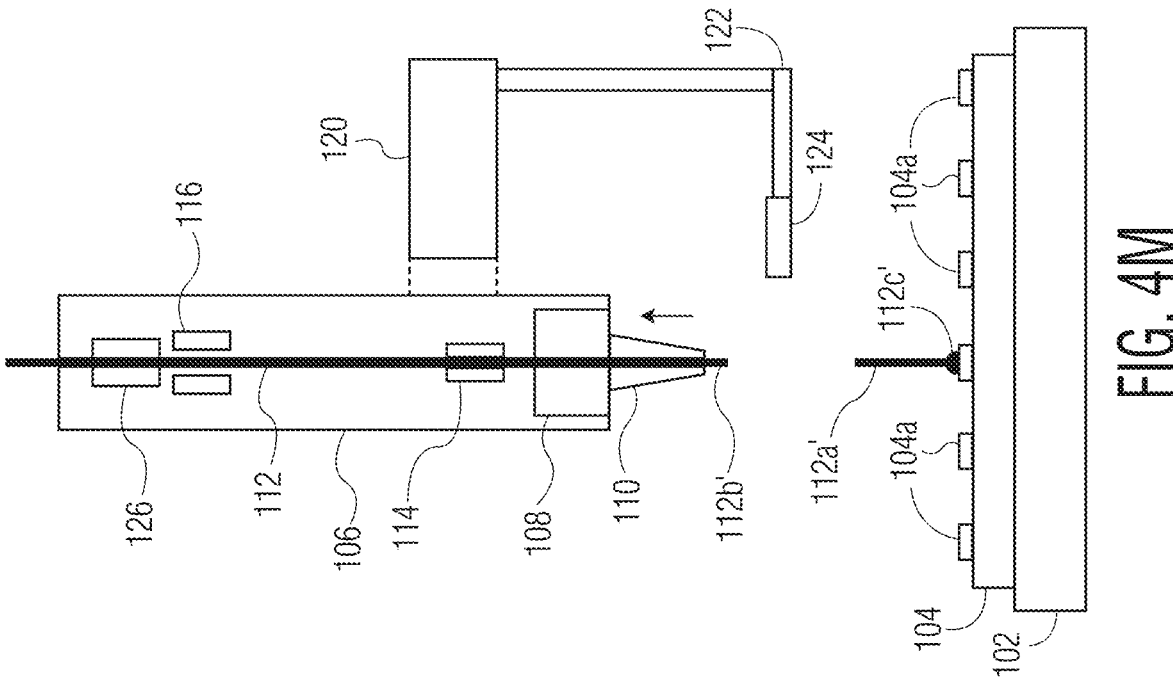

Referring now to FIG. 4I, with wire clamp 114 and wire clamp 116 both open, FAB 112c is seated at tip 110a of wire bonding tool 110 using wire tensioner 126. Referring now to FIG. 4J, wire bonding tool 110 has been moved down along the z-axis to bond FAB 112c (of FIG. 4I) to bond pad 104a. Transducer 108 provides ultrasonic energy (USG) to bond FAB 112c to bond pad 104a, thereby forming wire bond 112c'. Referring now to FIG. 4K, wire bonding tool 110 has moved up along the z-axis with both wire clamp 114 and wire clamp 116 in an open position. Referring now to FIG. 4L, wire clamp 114 of bond head assembly 106 has been closed, and at FIG. 4M, wire bonding tool 110 (along with wire clamp 114) is moved up along the z-axis, thereby breaking wire 112 at deformed portion 112b. Thus, a vertical wire structure 112a' is formed on bond pad 104a, and another end portion 112b' is shown below tip 110a of wire bonding tool 110.

The invention is not limited to the specific techniques illustrated and described in connection with FIGS. 1A-1J, FIGS. 2A-2J, FIGS. 3A-3M, and FIGS. 4A-4M. For example, in order to make the process more time efficient, certain steps may be optimized (e.g., combined in time, etc.) or omitted. Further, the operations of advancing and/or retreating a portion of wire may be varied from that shown. Although various motions of a wire bonding tool are illustrated as purely along the z-axis, it is understood that motions of a wire bonding tool in a vertical direction may move along an angular path (e.g., having both a z-axis component and at least one component in the xy-plane). For example, the downward motion of wire bonding tool 110 bending wire 112 (e.g., see FIG. 2B and/or FIG. 4F) may also include a lateral motion component (e.g., along the x-axis, along the y-axis, etc.). In another example, the downward motion of wire bonding tool 110 to form deformed portion 112b (e.g., see FIG. 1C, FIG. 2C, FIG. 3G, and/or FIG. 4G) may also include a lateral motion component (e.g., along the x-axis, along the y-axis, etc.).

FIG. 5 is a flow diagram illustrating a method of forming a vertical wire structure on a wire bonding system. As is understood by those skilled in the art, certain steps included in the flow diagram may be omitted; certain additional steps may be added; and the order of the steps may be altered from the order illustrated—all within the scope of the invention.

At Step 500, an end portion (e.g., end portion 112a) of a wire (e.g., wire 112) is provided below a wire bonding tool (e.g., wire bonding tool 110) on a wire bonding system (e.g., wire bonding system 100). For example, see end portion 112a in FIG. 1A, FIG. 2A, FIG. 3D, and FIG. 4D. At Step 502, a movable stage (e.g., movable stage 124) is moved with respect to the wire bonding tool. In certain embodiments, the movable stage may be moved beneath wire bonding tool to a contact position, thereby contacting a side of an end portion of the length of wire (e.g., see FIG. 1B and FIG. 3F). In certain embodiments, the movable stage may be moved to a position below (e.g., directly below, indirectly below) the end portion of wire without contacting the side of the end portion of wire (e.g., see FIG. 2A and FIGS. 4D-4E). At Step 504, a portion of the wire adjacent to the end portion is pressed against the movable stage with the wire bonding tool to form a deformed portion (e.g., deformed portion 112b) of the wire. For example, see deformed portion 112b in FIG. 1C, FIG. 2C, FIG. 3G, and FIG. 4G. At Step 506, a vertical wire structure (e.g., vertical wire structure 112a' of FIG. 1J, FIG. 2J, FIG. 3M, and FIG. 4M) is formed on a workpiece (e.g., workpiece 104) using the end portion of the wire. In certain embodiments, a further step of forming a free air ball (e.g., see FIGS. 1E, 2E, 3B, 4B) on an end (e.g., end 112a1) of the end portion is included (e.g., after Step 500); in such an embodiment, Step 506 includes bonding the free air ball to the workpiece such that the bonded free air ball is a lower part of the vertical wire structure (e.g., see FIGS. 1G, 2G, 3J, 4J). In certain embodiments, a further step of lowering the wire bonding tool with respect to the end portion of wire, after Step 504, to at least partially straighten the end portion of the wire, is included (e.g., see FIGS. 1D, 2D, 3H, 4H). In certain further embodiments, further steps of forming a free air ball (e.g., see FIGS. 1E, 2E, 3B, 4B) on an end of the end portion after Step 500, and seating the free air ball at the tip of the wire bonding tool (e.g., see FIGS. 1F, 2F, 3C, 4C), are included; in such an embodiment Step 506 includes bonding the free air ball to the workpiece such that the bonded free air ball is a lower part of the vertical wire structure (e.g., see FIGS. 1G, 2G, 3J, 4J).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wire bonding system comprising:
   a bond head assembly configured to carry a wire bonding tool, the bond head assembly including a first wire clamp, the wire bonding tool and the first wire clamp being configured to move together along a z-axis of the wire bonding system;
   a support structure configured to support a workpiece, the workpiece being configured for wire bonding;
   a movable stage assembly including a movable stage configured to move with respect to the wire bonding tool, the wire bonding tool being configured to press a wire engaged with the wire bonding tool against the movable stage to create a deformed portion of the wire, wherein an end portion of the wire extends from the deformed portion; and
   a second wire clamp, the second wire clamp being stationary with respect to the wire bonding tool and the first wire clamp along the z-axis,
   wherein the first wire clamp is configured to be closed and move downward along the z-axis, with the second wire clamp open, to advance the end portion of the wire prior to formation of the deformed portion of the wire,
   wherein the first wire clamp is configured to be open and move downward along the z-axis, with the second wire clamp closed, to at least partially straighten the end portion of the wire after formation of the deformed portion of the wire,
   wherein the movable stage is configured to move to a retracted position away from the wire bonding tool simultaneously with downward motion of the first wire clamp along the z-axis after formation of the deformed portion of the wire.

2. The wire bonding system of claim 1 wherein the end portion is a wire tail.

3. The wire bonding system of claim 1 wherein the end portion is configured to form a vertical wire structure on the workpiece.

4. The wire bonding system of claim 1 wherein the movable stage is supported by the bond head assembly.

5. The wire bonding system of claim 1 wherein the movable stage and the bond head assembly are supported by a common structure of the wire bonding system.

6. The wire bonding system of claim 1 wherein the movable stage assembly includes a motion system for moving the movable stage between a first position and a second position.

7. The wire bonding system of claim 6 wherein the movable stage assembly includes an arm assembly carrying the movable stage, the motion system moving the movable stage between the first position and the second position by moving the arm assembly.

8. The wire bonding system of claim 6 wherein the first position is the retracted position and the second position is a contact position, the wire bonding tool being configured to press the wire against the movable stage at the contact position.

9. The wire bonding system of claim 1 wherein the wire includes a wire tail extending below the wire bonding tool, and wherein movement of the movable stage from a first position to a second position results in bending of the wire tail through contact with the movable stage.

10. The wire bonding system of claim 9 wherein the wire bonding tool is configured to press the wire engaged with the wire bonding tool against the movable stage to create the deformed portion of the wire after bending of the wire tail through contact with the movable stage.

11. The wire bonding system of claim 1 wherein the wire includes a wire tail extending below the wire bonding tool, and wherein movement of the movable stage from a first position to a second position results in the movable stage being positioned below an end of the wire tail.

12. The wire bonding system of claim 11 wherein the bond head assembly is configured to press the wire engaged with the wire bonding tool against the movable stage to create the deformed portion of the wire after the movable stage is positioned below the end of the wire tail.

13. A method of forming a vertical wire structure on a wire bonding system, the method comprising the steps of:
    (a) providing an end portion of a wire below a tip of a wire bonding tool on the wire bonding system;
    (b) moving a movable stage with respect to the wire bonding tool;

(c) pressing a portion of the wire adjacent to the end portion against the movable stage with the wire bonding tool to form a deformed portion of the wire; and
    (d) forming the vertical wire structure on a workpiece using the end portion of the wire.

14. The method of claim 13 wherein the end portion of the wire extends from the deformed portion, and step (b) includes bending the end portion of the wire through contact with the movable stage.

15. The method of claim 13 wherein the end portion of the wire extends from the deformed portion, and step (b) includes moving the movable stage below the end portion of the wire.

16. The method of claim 13 wherein step (a) includes advancing the end portion of the wire below the tip of the wire bonding tool.

17. The method of claim 16 wherein the step of advancing includes (i) operating a first wire clamp and a second wire clamp of the wire bonding system in conjunction with (ii) moving of the first clamp and the wire bonding tool, to advance the end portion of the wire below the tip of the wire bonding tool.

18. The method of claim 16 wherein the step of advancing includes using ultrasonic energy to assist in the step of advancing the end portion of the wire.

19. The method of claim 13 further comprising a step of forming a free air ball on an end of the end portion after step (a), and wherein step (d) includes bonding the free air ball to the workpiece such that the bonded free air ball is a lower part of the vertical wire structure.

20. The method of claim 13 further comprising a step of lowering the wire bonding tool with respect to the end portion of wire, after step (c), to at least partially straighten the end portion of the wire.

21. The method of claim 20 further comprising a step of forming a free air ball on an end of the end portion after step (a), the method further comprising a step of seating the free air ball at the tip of the wire bonding tool prior to step (d), and wherein step (d) includes bonding the free air ball to the workpiece such that the bonded free air ball is a lower part of the vertical wire structure.

22. The method of claim 21 wherein step (d) includes raising the wire bonding tool above the bonded free air ball, and tearing the wire at the deformed portion.

\* \* \* \* \*